(12) United States Patent
Tsuyuki et al.

(10) Patent No.: US 7,814,732 B2
(45) Date of Patent: Oct. 19, 2010

(54) LIQUID CONTAINING BAG, LIQUID CARTRIDGE, IMAGE FORMING DEVICE, AND SEALING METHOD AND SEALING APPARATUS FOR THE LIQUID CONTAINING BAG

(75) Inventors: Takanori Tsuyuki, Shizuoka (JP); Masami Iguchi, Shizuoka (JP); Moriaki Saitoh, Shizuoka (JP); Hideki Sugiyama, Shizuoka (JP); Kiyohiro Uehara, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 818 days.

(21) Appl. No.: 11/733,012

(22) Filed: Apr. 9, 2007

(65) Prior Publication Data

US 2007/0176986 A1 Aug. 2, 2007

Related U.S. Application Data

(62) Division of application No. 10/822,819, filed on Apr. 13, 2004, now Pat. No. 7,222,948.

(30) Foreign Application Priority Data

Apr. 18, 2003 (JP) ............................. 2003-114901

(51) Int. Cl.
*B65B 3/04* (2006.01)
*B65B 7/02* (2006.01)
*B65B 51/10* (2006.01)

(52) U.S. Cl. ............................. 53/469; 53/477; 53/479

(58) Field of Classification Search .................. 347/84, 347/85, 86; 222/95, 96; 53/284.7, 374.2, 53/469, 477, 479
See application file for complete search history.

(56) References Cited

U.S. PATENT DOCUMENTS

| | | | | |
|---|---|---|---|---|
| 3,765,144 A | * | 10/1973 | Schiesser | 53/412 |
| 4,243,448 A | * | 1/1981 | Fagniart et al. | 156/73.5 |
| 4,654,965 A | | 4/1987 | Uehara et al. | |
| 4,772,885 A | | 9/1988 | Uehara et al. | |
| 4,793,691 A | | 12/1988 | Enomoto et al. | |
| 4,892,604 A | * | 1/1990 | Measells et al. | 156/244.24 |
| 4,896,946 A | | 1/1990 | Suzuki et al. | |
| 4,930,876 A | | 6/1990 | Suzuki et al. | |
| 5,011,266 A | | 4/1991 | Suzuki et al. | |
| 5,067,796 A | | 11/1991 | Suzuki et al. | |
| 5,126,767 A | | 6/1992 | Asai | 347/86 |
| 5,157,421 A | | 10/1992 | Kitahara | 347/86 |
| 5,307,091 A | | 4/1994 | DeCoste, Jr. | 347/86 |
| 5,606,844 A | * | 3/1997 | Takagaki et al. | 53/410 |
| 5,860,363 A | | 1/1999 | Childers et al. | |

(Continued)

FOREIGN PATENT DOCUMENTS

JP 10-193635 7/1998

(Continued)

*Primary Examiner*—Anh T. N. Vo
(74) *Attorney, Agent, or Firm*—Oblon, Spivak, McClelland, Maier & Neustadt, L.L.P.

(57) ABSTRACT

A liquid containing bag includes a liquid filling opening part having a tube configuration through which an inside of the liquid containing bag is filled with liquid. The liquid filling opening part is melt-sealed from directions which face each other in a part of the liquid filling opening part. The part which is melted has a non-symmetrical configuration.

10 Claims, 27 Drawing Sheets

U.S. PATENT DOCUMENTS

| | | |
|---|---|---|
| 5,879,439 A | 3/1999 | Nagai et al. |
| 5,882,390 A | 3/1999 | Nagai et al. |
| 5,972,082 A | 10/1999 | Koyano et al. |
| 5,993,524 A | 11/1999 | Nagai et al. |
| 6,105,821 A | 8/2000 | Christine et al. ............ 222/105 |
| 6,120,589 A | 9/2000 | Bannai et al. |
| 6,220,702 B1 | 4/2001 | Nakamura et al. ............ 347/86 |
| 6,231,652 B1 | 5/2001 | Koyano et al. |
| 6,261,349 B1 | 7/2001 | Nagai et al. |
| 6,264,098 B1 | 7/2001 | Drummond et al. ...... 229/123.1 |
| 6,306,473 B1 | 10/2001 | Denpou et al. ............. 428/35.2 |
| 6,609,789 B1 | 8/2003 | Hunt ........................... 347/86 |
| 7,048,348 B2 | 5/2006 | Mochizuki et al. ............. 347/7 |

FOREIGN PATENT DOCUMENTS

| | | |
|---|---|---|
| JP | 10-202900 | 8/1998 |
| JP | 10-202901 | 8/1998 |
| JP | 11-11580 | 1/1999 |
| JP | 2001-72019 | 3/2001 |
| JP | 2001-305699 | 11/2001 |
| JP | 2002-46712 | 2/2002 |
| JP | 2002-193215 | 7/2002 |

\* cited by examiner

FIG.23
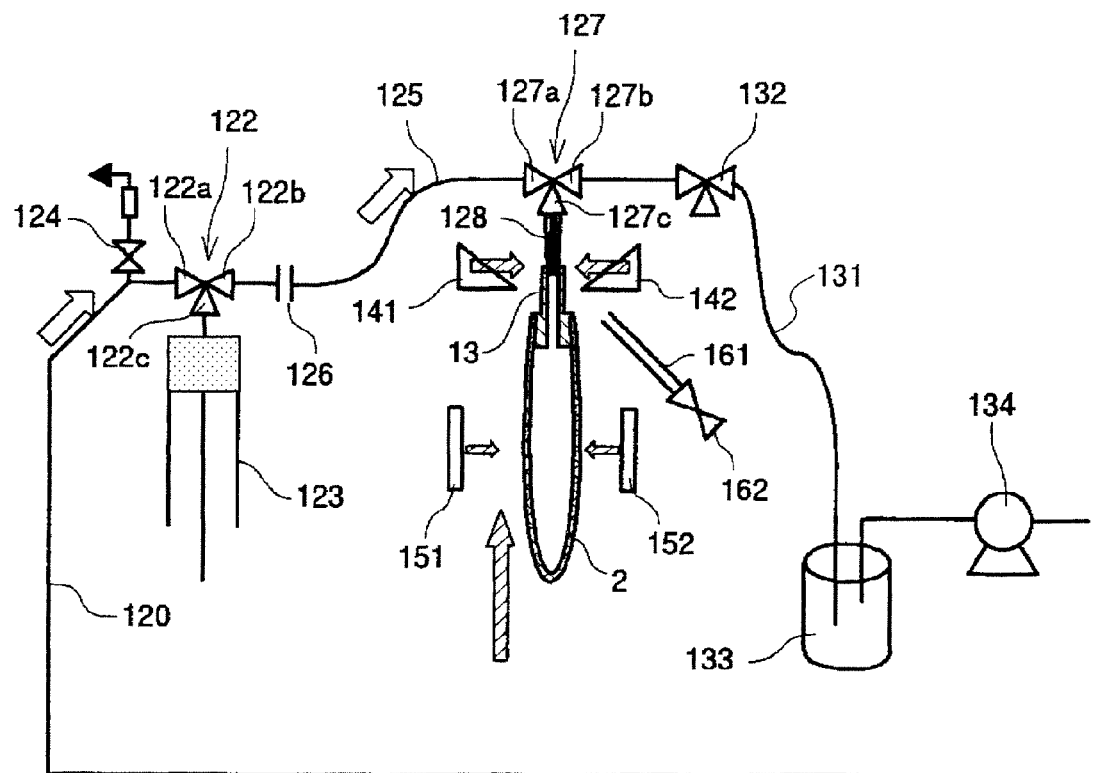
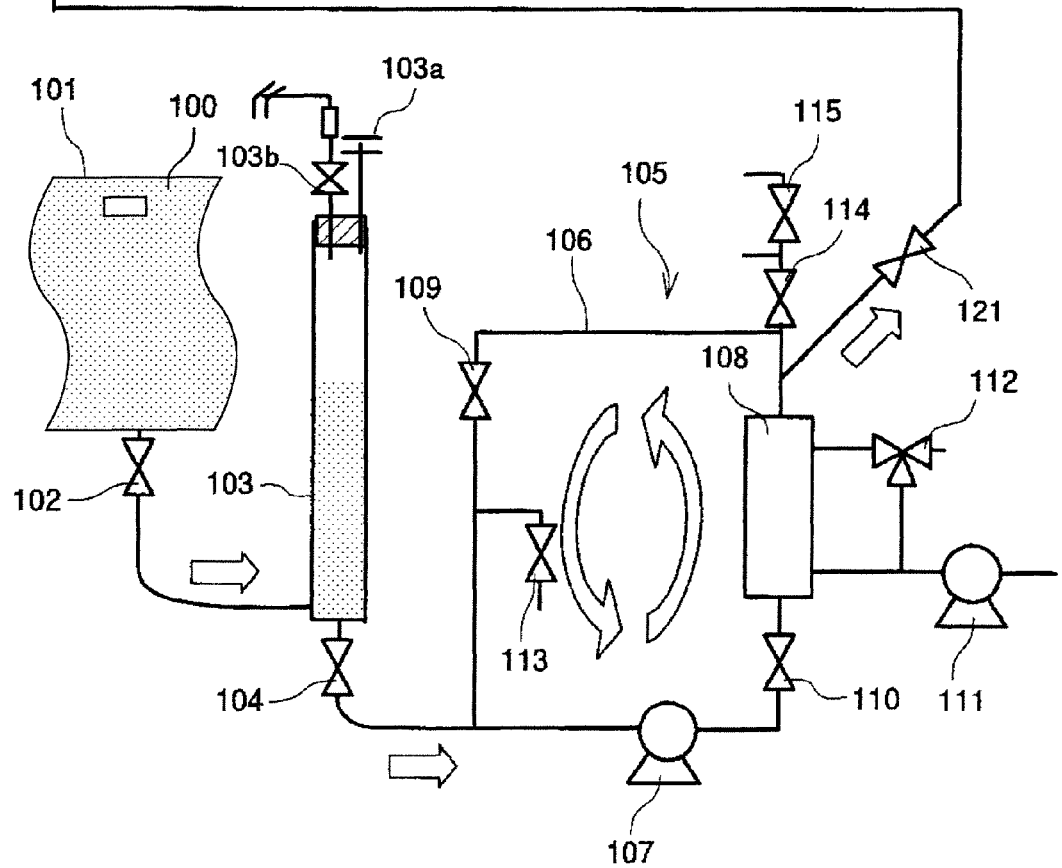

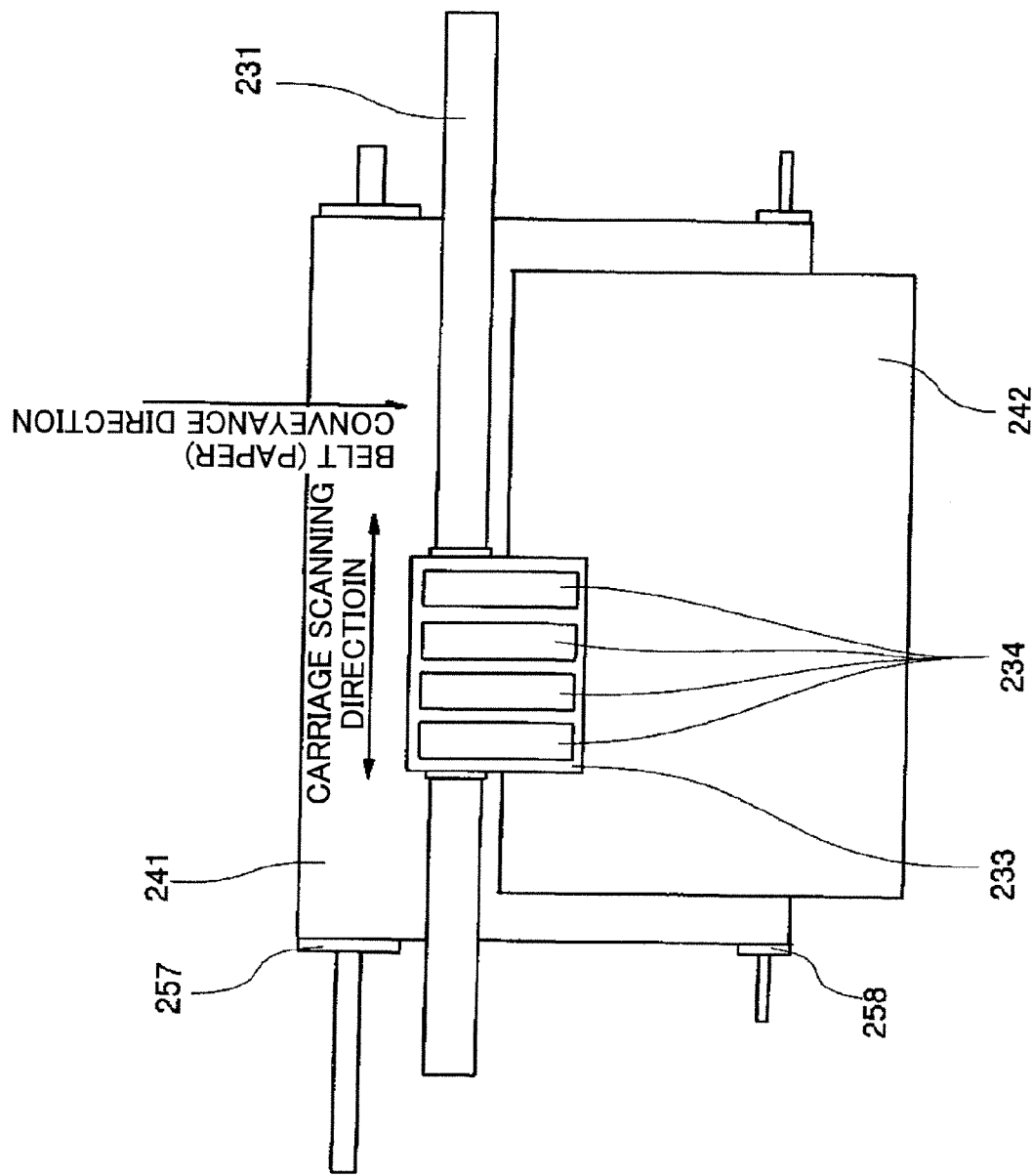

LIQUID CONTAINING BAG, LIQUID CARTRIDGE, IMAGE FORMING DEVICE, AND SEALING METHOD AND SEALING APPARATUS FOR THE LIQUID CONTAINING BAG

CROSS-REFERENCE TO RELATED APPLICATIONS

This application is a division of and is based upon and claims the benefit of priority under 35 U.S.C. §120 for U.S. Ser. No. 10/822,819, filed Apr. 13, 2004, and claims the benefit of priority under 35 U.S.C. §119 from Japanese Patent Application No. 2003-114901, filed Apr. 18, 2003, the entire contents of each which are incorporated herein by reference.

BACKGROUND OF THE INVENTION

1. Field of the Invention

The present invention generally relates to liquid containing bags, liquid cartridges, image forming devices, and sealing methods and sealing apparatuses for the liquid containing bags.

2. Description of the Related Art

An ink jet recording device is known as an image forming device or an image recording device such as a printer, facsimile, or copier. In the ink jet recording device, ink is jetted from a recording head to a form so that recording can be performed. Here, the form includes not only paper but also OHP (Overhead Projector) film and means a material where an image is formed. The form is also called a recorded medium, a recording medium, a recording paper, or the like. It is possible to record a high precision image at a high speed by an ink jet recording device on a recording medium. In addition, running cost is cheap and noise is small in the ink jet recording device. Furthermore, it is easy to record a color image by using a lot of kinds of colors, in the ink jet recording device.

As the above mentioned ink jet recording device, a shuttle type ink jet recording device is generally used. In the shuttle type ink jet recording device, an ink tank (ink cartridge) is installed in a carriage which performs a reciprocating motion along a recording medium with a recording head in a body. There is a limitation to the amount of ink to be installed in such a carriage installed type ink cartridge. Because of this, an ink cartridge main body installed type ink jet recording device, wherein the ink cartridge is provided at a fixed part of a main body of the device and the ink is supplied to the carriage through a flexible pipe, is used so that a large amount of forms can be printed.

Meanwhile, as for a structure of the ink cartridge, in a case of the carriage installed type, ink is absorbed by a capillary force of a porous body installed in the cartridge, and hole diameters of the porous bodies and an ink filling amount are controlled, so that pressure of ink supplied to a recording head is controlled to be a negative pressure. Such an ink cartridge type has been widely used.

On the other hand, in the case of the ink cartridge main body installed type, a function to control the pressure of the ink supplied to the recording head is provided to the carriage of the main body of the device. Hence, in the ink cartridge, an ink bag which contains a large ink amount wherein the ink can be supplied in a sealed state, is advantageous and utilized.

A cartridge wherein a housing which is formed by a solid rectangular shell is filled with ink as discussed in Japanese Laid-Open Patent Application No. 10-202901, and a cartridge which has a flexible ink bath which has a bag configuration, an ink outlet, and a chassis part (housing) having an opening part through which the ink bath can be taken into and out from the chassis part as discussed in Japanese Laid-Open Patent Application No. 10-202900, are also known.

Furthermore, an ink cartridge shown in FIG. 1 is also known. This cartridge includes an ink containing part 501 for containing ink, a case 502 having a tube configuration for containing the ink containing part, and a cover member 503 for covering a front surface of the case 502 having the tube configuration. A holding member 504 is provided to the ink containing part 501 in a body. The holding member 504 has an ink filling opening part 505 for filling the ink containing part 501 with ink, which is sealed and has a pipe configuration, and an ink supply opening part 506 for supplying the ink, which also has a pipe configuration. The holding member 504 is pushed into the case 502 so that a projection part 504a of the holding member 504 is engaged with a receiving hole forming part 502a provided on a wall surface of the case 502 and the holding member 504 is fixed and held to the case 502. Furthermore, the cover member 503 is fit into an opening part of the case 502.

The ink containing part 501 is formed by making the holding member 504 and a frame body 511 in a body and melt-fusing a film-shaped member 512 to the outside of the frame body 511. The inside of the film-shaped member 512 is formed by a resin film and the outside of the film-shaped member 512 is formed by an aluminum film.

Meanwhile, aqueous ink is mainly used for an ink jet recording device. The aqueous ink is manufactured by a process for mixing and scattering raw materials and by a process for filtering the raw materials. If the ink tank is filled with the ink manufactured by the above mentioned processes without any change so that recording is performed, various gases dissolved in the ink such as nitrogen, oxygen, and carbonic acid gas are changed to bubbles in an ink flow path before/in the recording head. This causes bad recording such as dot-off.

In order to solve the above mentioned problem, a deaeration process for reducing dissolved gas in the ink is performed before the ink tank is filled with the ink. A method for decompressing and stirring the ink in a pressure container or a method for deaerating by a deaeration device using a gas separation film is used as a method for the deaeration process.

It is required to fill and seal the ink bag containing the ink deaerated by the above mentioned method without allowing air into the bag. Hence, as discussed in Japanese Laid-Open Patent Application No. 10-193635, a method by which the ink is poured into an ink bag provided at a decompression room in a state where the exterior of the ink bag is compressed, and the ink is sealed in the ink bag without allowing air into the ink bag by heating, melting, and sealing (melt-sealing) the bag without any change, has been known.

However, according to the above mentioned method, it is necessary to provide a decompression room and a mechanism for melt-fusing (melt-sealing) the ink bag in the decompression room. As a result of this, the entire device for filling and sealing the ink bag is complex and expensive. Furthermore, since the volume to be decompressed becomes large and therefore time for decompressing becomes long, so that a productivity is reduced.

Because of this, as discussed above with reference to FIG. 1, it is possible to improve reliability and secure productivity by providing ink opening parts, namely an ink supply opening part for supplying the ink into the outside, and an ink filling opening part for filling the inside of the ink bag with ink, discharging gas existing on the inside from the ink filling opening part, filling the ink bag with the ink via the ink filling opening part, and sealing the ink filling opening part. This is because the amount of gas discharge can be small and a part for sealing can be small. However, in this case, there is a problem in that it is difficult to seal the ink filling opening part easily and securely.

SUMMARY OF THE INVENTION

Accordingly, it is a general object of the present invention to provide a novel and useful liquid containing bag, liquid cartridge, image forming device, and sealing method and sealing apparatus for the liquid containing bag, in which one or more of the problems described above are eliminated.

Another and more specific object of the present invention is to provide a liquid containing bag having a filling opening part which is sealed easily and securely, a liquid cartridge having the liquid containing bag, an image forming device having the liquid cartridge, and a sealing method and sealing apparatus for sealing the filling opening part of the liquid containing bag easily and securely.

The above objects of the present invention are achieved by a liquid containing bag, including:

a liquid filling opening part having a tube configuration through which an inside of the liquid containing bag is filled with liquid;

wherein the liquid filling opening part is melt-sealed from directions which face each other in a part of the liquid filling opening part, and the part which is melted has a non-symmetrical configuration.

The above objects of the present invention are achieved by a liquid cartridge, including:

a liquid containing bag including a liquid filling opening part having a tube configuration through which an inside of the liquid containing bag is filled with liquid;

wherein the liquid filling opening part is melt-sealed from directions which face each other in a part of the liquid filling opening part, and the part which is melted has a non-symmetrical configuration.

The above objects of the present invention are achieved by an image forming device, including:

a liquid cartridge including a liquid containing bag which includes a liquid filling opening part having a tube configuration through which an inside of the liquid containing bag is filled with liquid;

wherein the liquid filling opening part is melt-sealed from directions which face each other in a part of the liquid filling opening part, and the part which is melted has a non-symmetrical configuration.

The above objects of the present invention are achieved by a sealing method for sealing a liquid filling opening part of a liquid containing bag, the liquid filling opening part having a tube configuration through which an inside of the liquid containing bag is filled with liquid, including:

a step of melt-sealing the liquid filling opening part by pushing melt-fusing heads, whose temperatures are different, from two directions which face each other to the liquid filling opening part.

The above objects of the present invention are achieved by a sealing apparatus for sealing a liquid filling opening part of a liquid containing bag, the liquid filling opening part having a tube configuration through which an inside of the liquid containing bag is filled with liquid, including:

at least two melt-fusing heads which are moveable and face each other;

wherein the liquid filling opening part is put between the melt-fusing heads, the temperatures of the melt-fusing heads are different, and the liquid filling opening part is melt-sealed by pushing the melt-fusing heads to the liquid filling opening part.

Other objects, features, and advantages of the present invention will become more apparent from the following detailed description when read in conjunction with the accompanying drawings.

BRIEF DESCRIPTION OF THE DRAWINGS

FIG. 23 is a structural view of a filling apparatus including a sealing apparatus of the present invention;

FIG. 35 is a plan view of a main part of the mechanism shown in FIG. 34.

DETAILED DESCRIPTION OF THE PREFERRED EMBODIMENTS

A description is next given, with reference to FIG. 2 through FIG. 35, of embodiments of the present invention.

Figure 2:
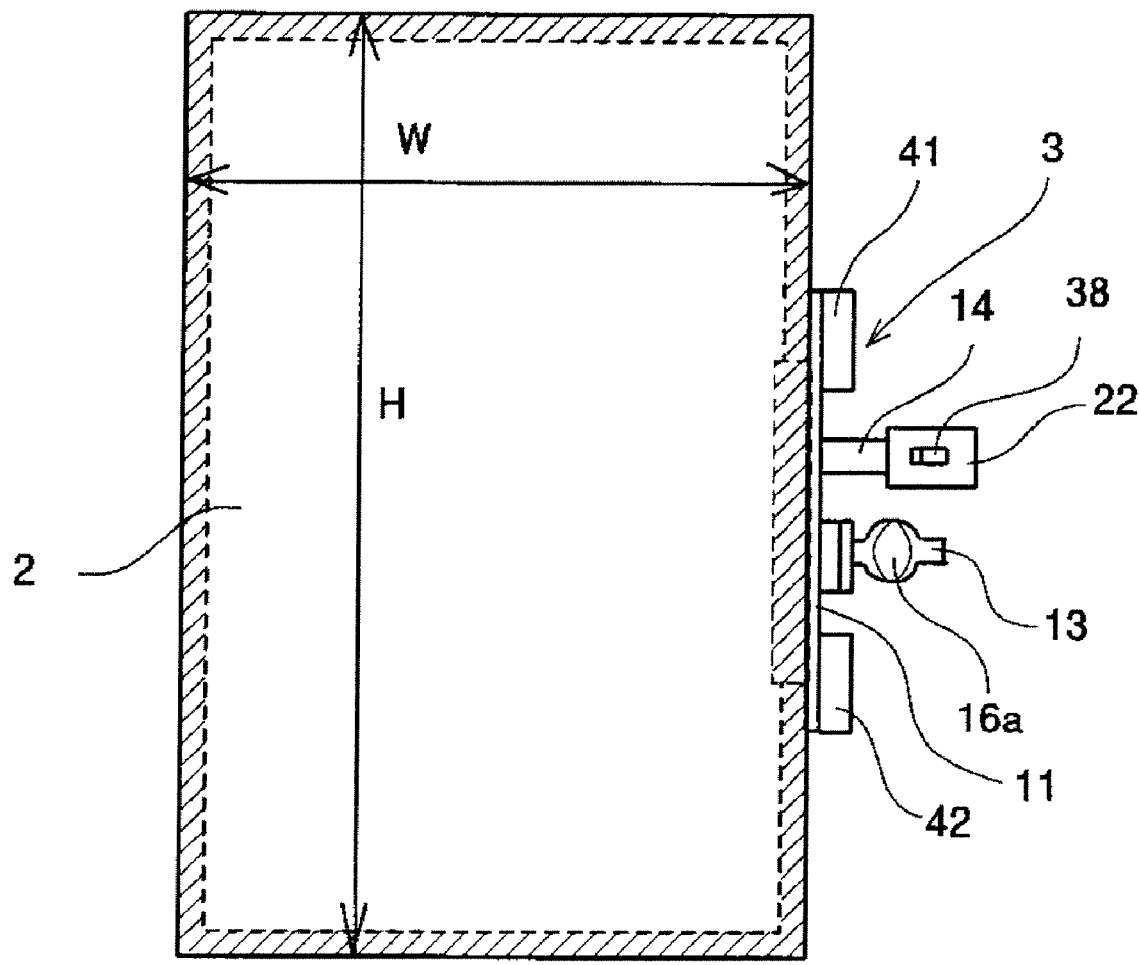
FIG. 2 is a side view of an ink bag which is an example of a liquid containing bag of the present invention.
Figure 3:
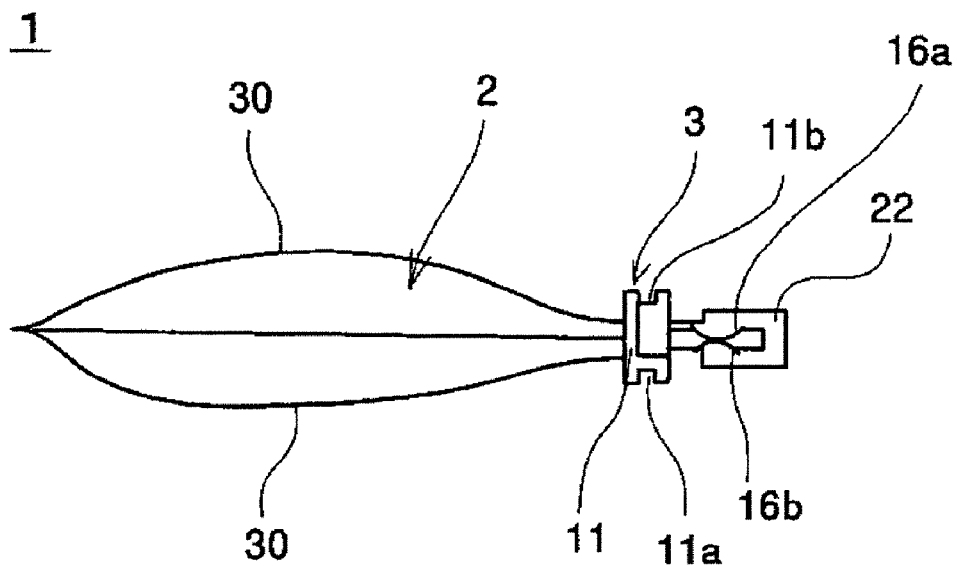
FIG. 3 is a view of a state where the ink bag is filled with ink, seen from a lower side of FIG. 2.
Figure 4:
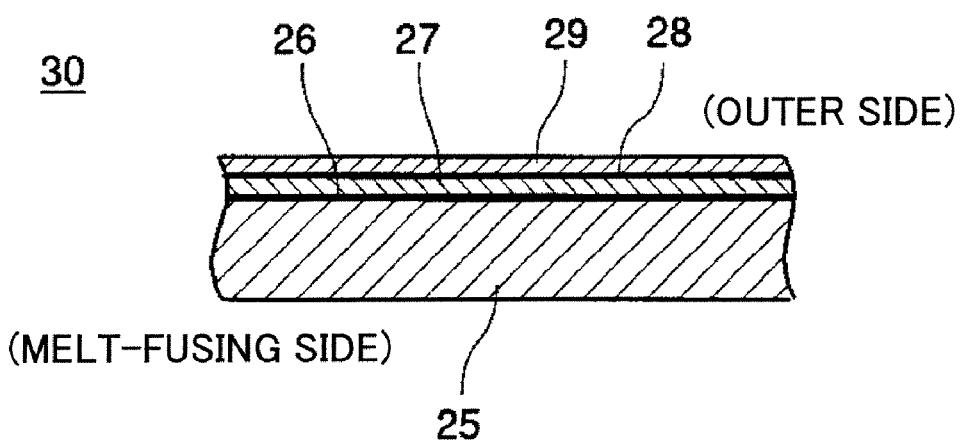
FIG. 4 is a cross-sectional view of an aluminum laminate film forming a bag body of the ink bag.
Figure 5:
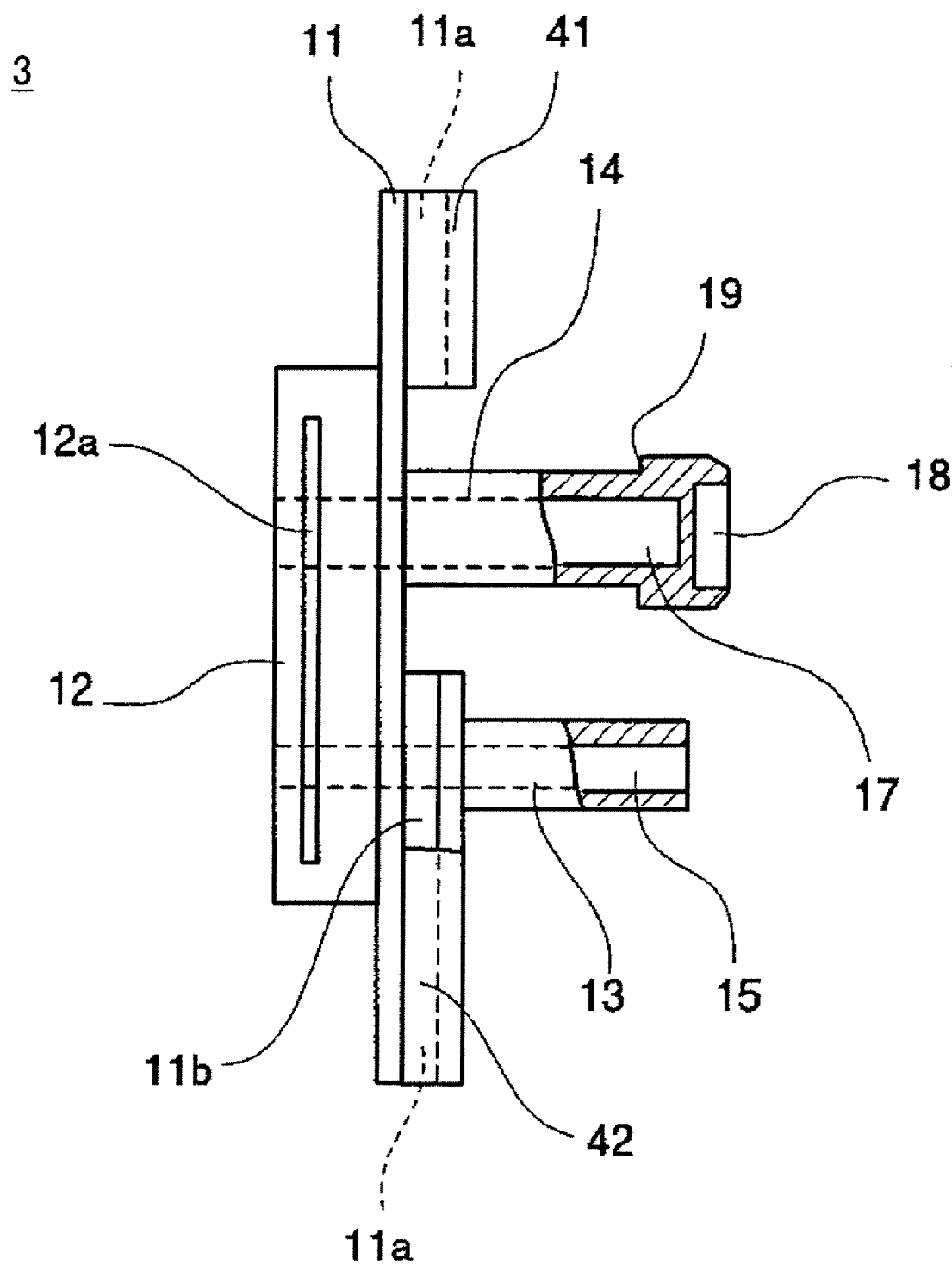
FIG. 5 is a side view showing a state before a holding member of the ink bag is melt-sealed.
Figure 6:
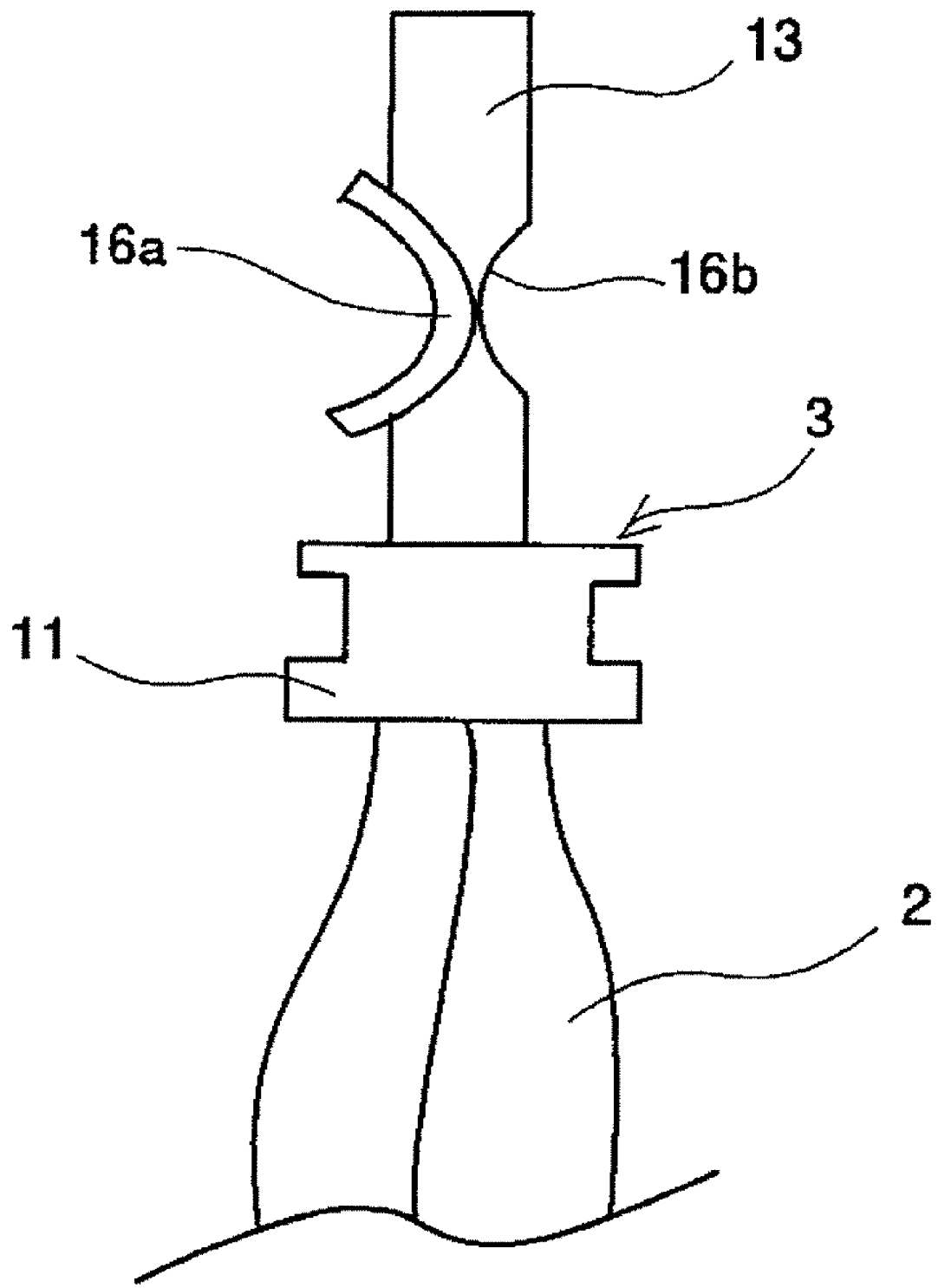
FIG. 6 is an enlarged side view for explanation of a state where the ink bag is melt-sealed.
Figure 7:
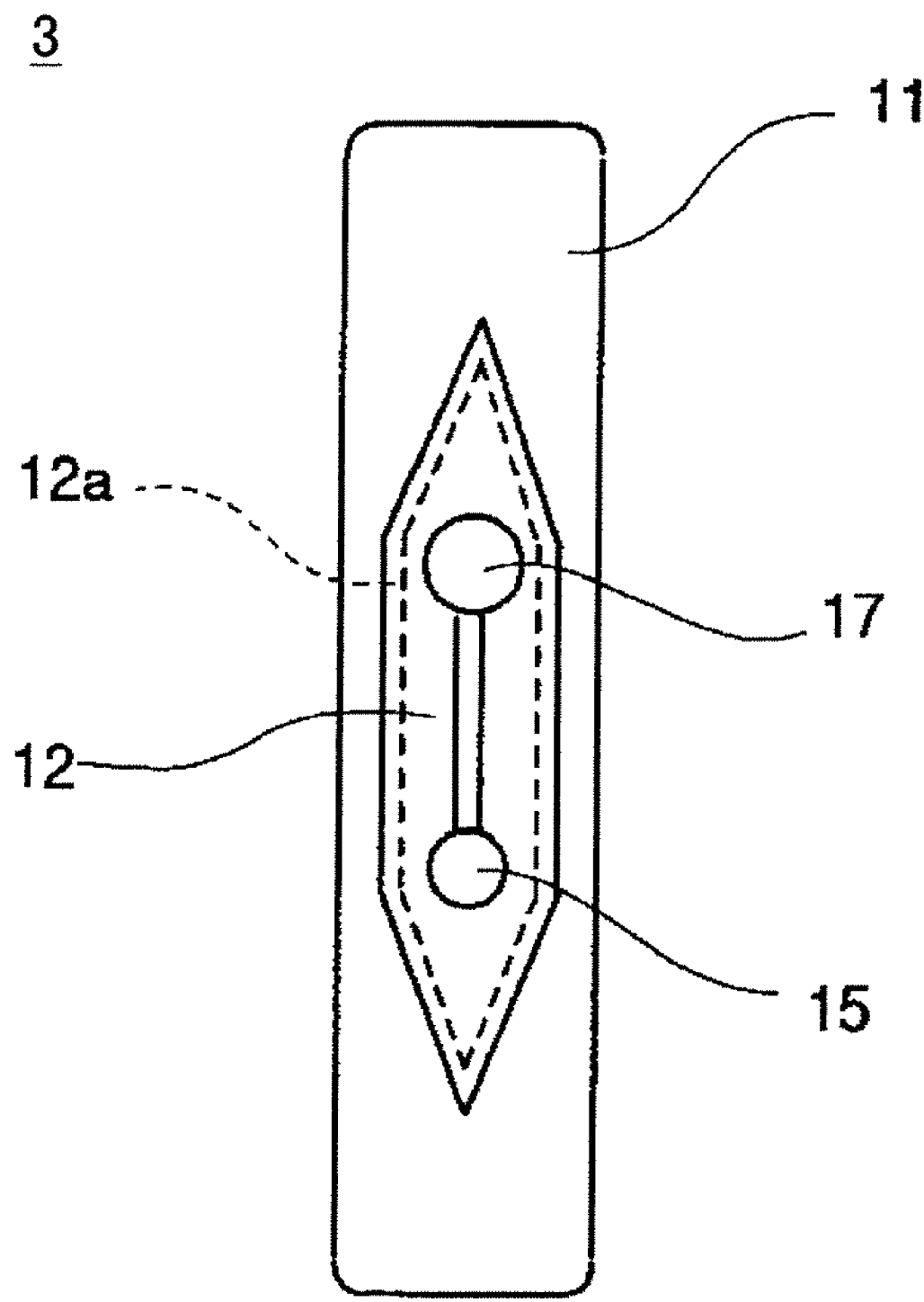
FIG. 7 is a view of the holding member shown in FIG. 6 seen from a back surface side.
Figure 8:
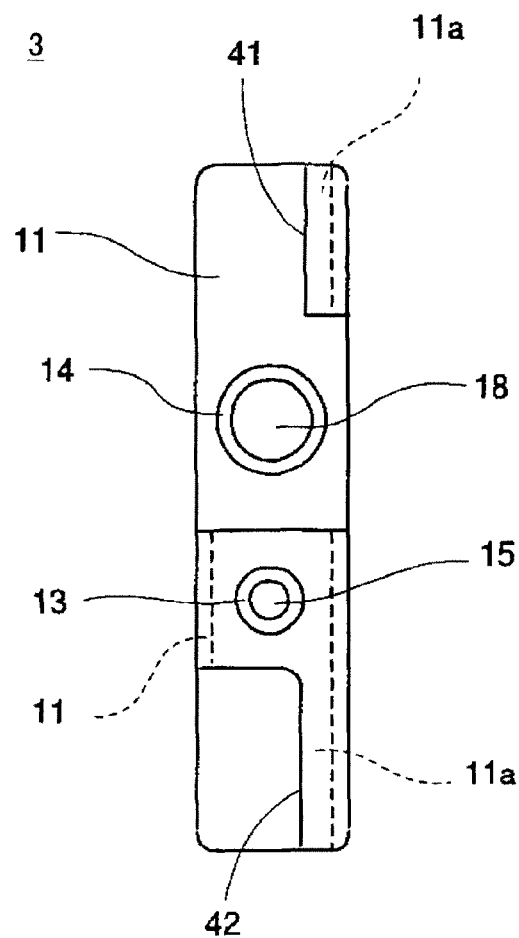
FIG. 8 is a view of the holding member shown in FIG. 6 seen from a front surface side.
Figure 9:
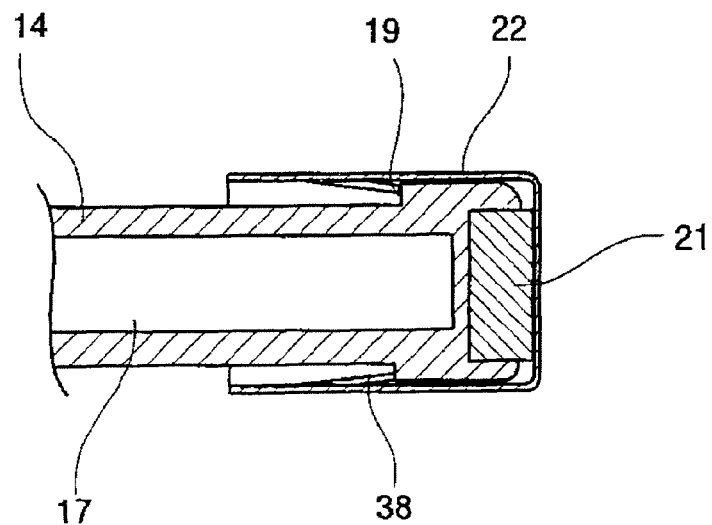
FIG. 9 is a main part cross-sectional view of an ink discharge opening part of the ink bag.
Figure 10:
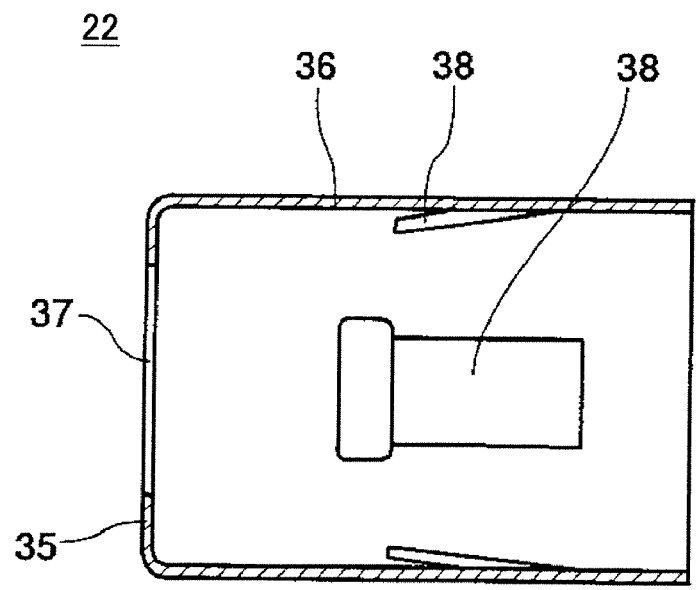
FIG. 10 is a cross-sectional view of a cap member of the ink discharge opening part.
Figure 11:
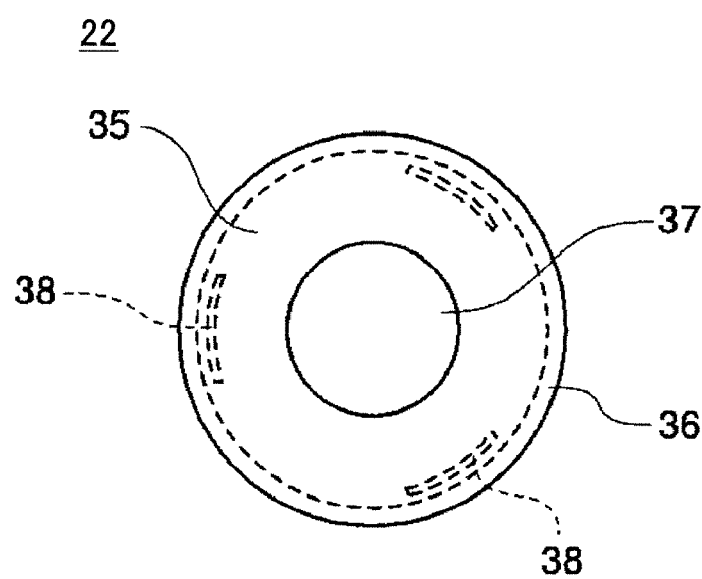
FIG. 11 is a view of the cap member seen from a front surface side.

First, an example of a structure of an ink bag which is an example of a liquid containing bag of the present invention is discussed with reference to FIG. 2 through FIG. 11. Here, FIG. 2 is a side view of the ink bag. FIG. 3 is a view of a state where the ink bag is filled with ink, seen from a lower side of FIG. 2. FIG. 4 is a cross-sectional view of an aluminum laminate film forming a bag body of the ink bag. FIG. 5 is a side view showing a state before a holding member of the ink bag is melt-sealed. FIG. 6 is an enlarged side view for explanation of a state where the ink bag is heated, melted, and sealed (melt-sealed). FIG. 7 is a view of the holding member shown in FIG. 6 seen from a back surface side. FIG. 8 is a view of the holding member shown in FIG. 6 seen from a front surface side. FIG. 9 is a main part cross-sectional view of an ink discharge opening part of the ink bag. FIG. 10 is a cross-sectional view of a cap member of the ink discharge opening part. FIG. 11 is a view of the cap member seen from a front surface side.

As shown in FIG. 2 and FIG. 3, an ink bag 1 is formed by a holding member 3 being melted and fixed (melt-fixed) to one of the long sides of a bag main body 2. The bag main body 2 is made of an aluminum laminate film and has a substantial quadrilateral configuration (a rectangular configuration in this example) and a flexible property. The holding member 3 is made of resin.

As shown in FIG. 2 and FIG. 3, the bag main body 2 is formed by heating and fusing (melt-fusing) external circumferences (areas drawn by hashing in FIG. 2) of two aluminum laminate films 30 with each other and melt-fusing the aluminum laminate films 30 to the holding member 3, so as to have a bag-shaped configuration. As shown in FIG. 4, the aluminum laminate film 30 has a structure wherein dry lamination 26, an aluminum film 27, dry lamination 28, and PA (polyamide) 29 are stacked on LDPE (Low density polyethylene) 25 in that order. A frame body which is used for keeping the configuration of the bag main body 2 in the conventional art is not provided inside of the bag main body 2 of the present invention. Instead, the bag main body 2 has a flexible property as a whole. Hence, it is possible to prevent having leftover ink.

Although the bag main body 2 is formed by the aluminum laminate film 30 in this embodiment, the material for forming the bag main body 2 is not limited to this. However, it is preferable to form the bag main body 2 by a material including at least the aluminum laminate film.

Referring back to FIG. 2, it is preferable that a ratio of a height H and a width W of the bag main body 2 be equal to or larger than 1 and equal to or smaller than 1.5, so that it is possible to secure a hydrostatic pressure sufficient to reduce the residual ink (amount of the ink remaining in the ink bag) in a case where the ink bag is provided lengthwise, namely the ink is discharged/supplied in a horizontal direction.

Figure 12:
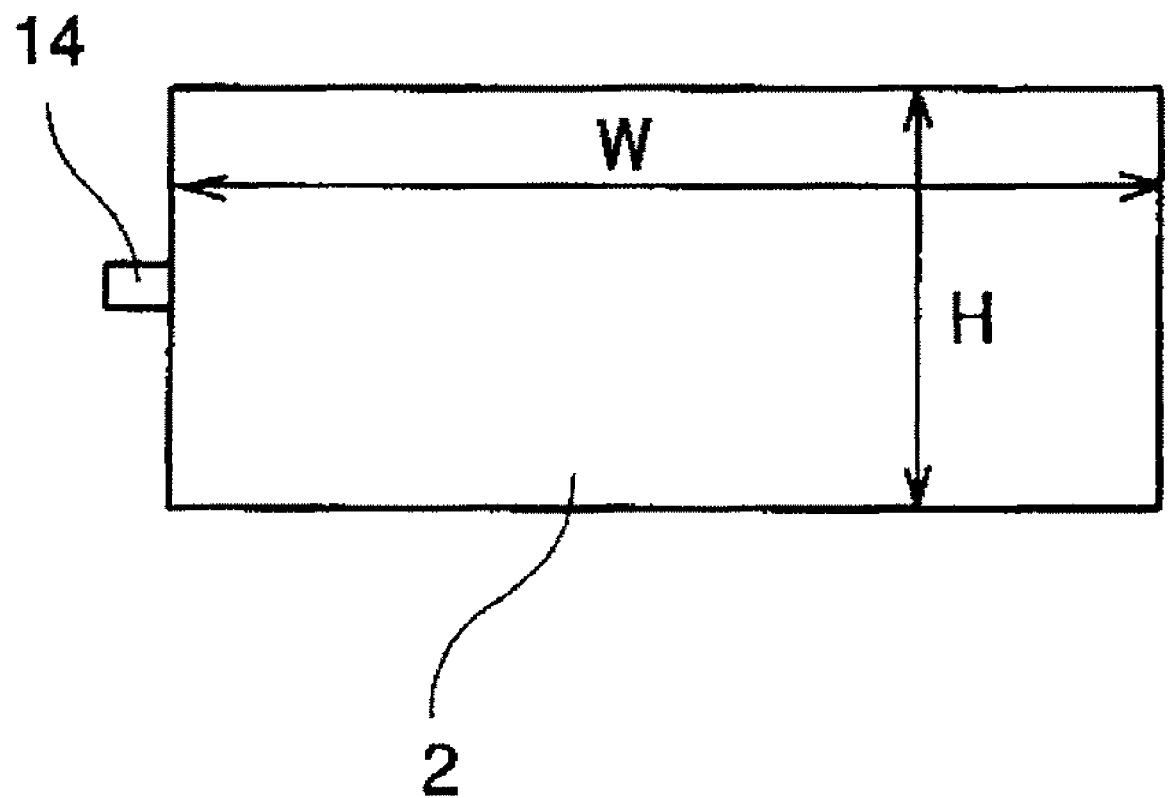
FIG. 12 is a view for explanation of a measurement of a relationship between a ratio of length and breadth of the ink bag and a hydrostatic pressure.
Figure 13:
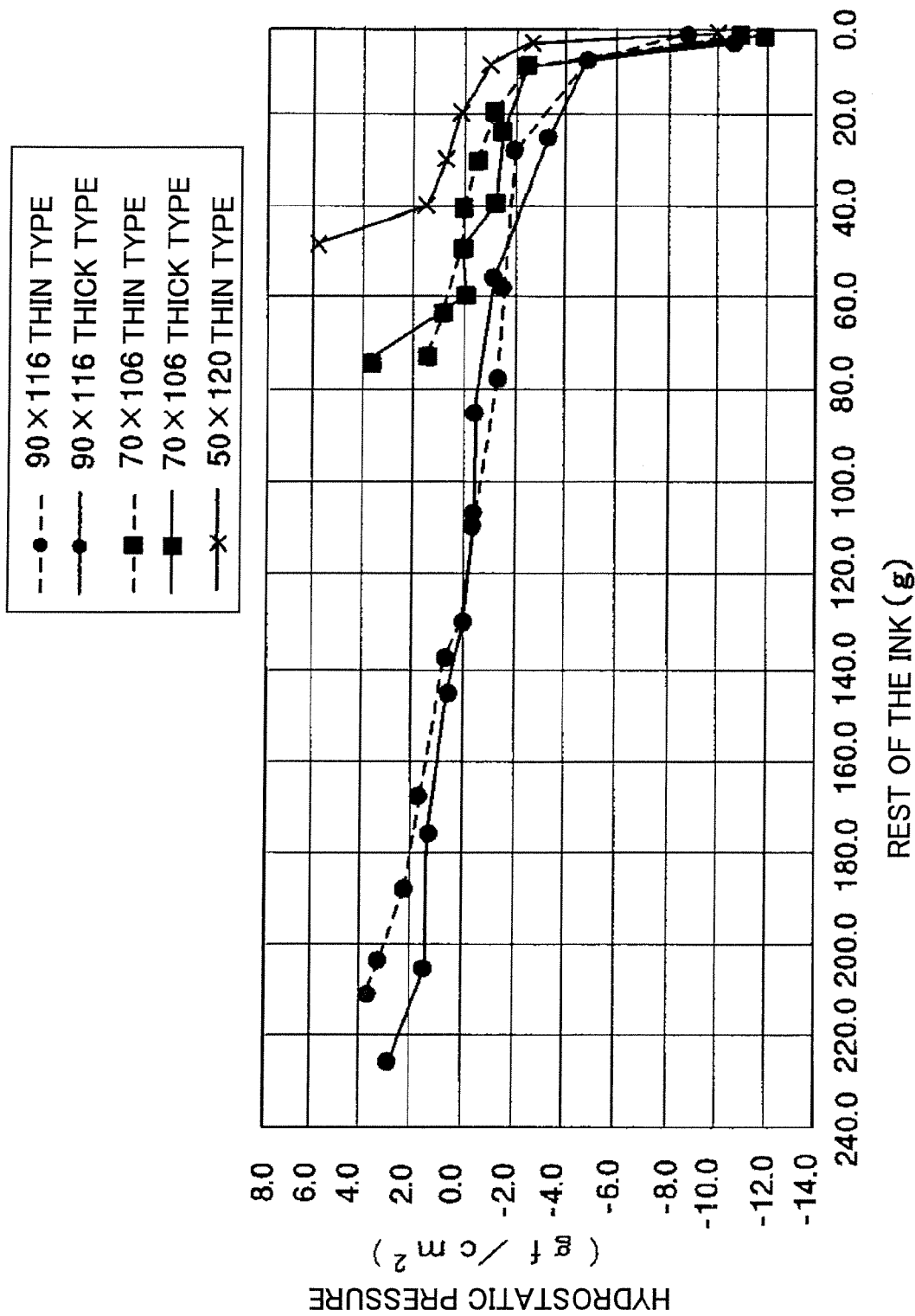
FIG. 13 is a graph showing an example of a result of a measurement of a relationship between a ratio of length and breadth of the ink bag and hydrostatic pressure.

Here, with reference to FIG. 12 and FIG. 13, an example of a relationship between a configuration of the bag main body 2 and the hydrostatic pressure of the ink discharge opening part is discussed.

In this example, as shown in FIG. 12, the bag main body 2 has a configuration wherein the width W is longer than the height H. Furthermore, three kinds of ink bag main bodies, namely ① H×W is 90×116 (that is H:W is 1:1.29), ② H×W is 70×106 (that is H:W is 1:1.5), and ③ H×W is 50×126 (that is H:W is 1:2.52) are prepared for comparison. In addition, two kinds of housings (cases) for containing the ink bag, namely a housing whose width is thin and a housing whose width is thick, are used for the comparison.

A relationship between the remaining ink (the amount of the ink remaining in the ink bag) and the hydrostatic pressure of the ink discharge opening part 14 is measured by combining the above mentioned ink bag main bodies and the housings (cases). A result of the measurement is shown in FIG. 13. Note that a case where the ink main bag in a state where H×W is 50×126 (that is H:W is 1:2.52) is contained by the housing whose width is thick is not measured.

It is preferred that the hydrostatic pressure of the ink discharge opening part 14 be approximately 0 gf/cm$^2$ so that the ink can be stably supplied to a sub tank.

As shown in FIG. 13, in the case of the bag main bodies wherein H×W is 90×116 (that is, H:W is 1:1.29), the hydrostatic pressure of the ink discharge opening part is stable and 0 gf/cm$^2$ in a wide range of the remaining ink (the amount of the ink remaining in the ink bag).

On the other hand, in the case of the bag main bodies wherein H×W is 70×106 (that is, H:W is 1:1.5), although it is attempted to fill the ink bag with 100 g of ink is attempted to be filled, the hydrostatic pressure of the ink discharge opening part rises suddenly to 2 gf/cm$^2$ (thin type) or 4 gf/cm$^2$ (thick type) when the amount of the ink is approximately 70 g. In the case of the bag main bodies wherein H×W is 50×126 (that is, H:W is 1:2.52), although 100 g of the ink is attempted to be pumped in, the hydrostatic pressure of the ink discharge opening part rises suddenly when the amount of the ink is approximately 50 g.

As a result of this, although it depends on the width of the housing (case) of the ink cartridge, as a structure of the ink bag main body, it is preferable that H:W be in a range of 1 through 1.5.

As shown in FIG. 5, in the holding member 3, a connection part 12 for melt-fusing the bag main body 2 is integrally formed on one surface side of a flange part 11, and a hollow-shaped ink filling opening part 13 (shown in FIG. 5 under a state where it is not melt-sealed) and a hollow-shaped ink discharge opening part 14 are integrally formed on the other surface side of the flange part 11.

As shown in FIG. 7, both ends (ends part in a longitudinal direction of the holding member 3) of the connection part 12 are shaped as taper configurations so as to have a substantially polygonal configuration. Furthermore, a concave part 12a is formed at an external circumferential surface of the connection part 12. Because of this, the aluminum laminate film 30 forming the ink bag main body 2 can be melt-fused at a circumferential surface of the connection part 12 precisely without any gap.

A piercing hole forming part 15 for filling the ink bag with ink is provided inside of the ink filling opening part 13 so as to pierce the flange part 11 and the connection part 12. After the ink fills the ink bag body part 2 of the ink bag 1 under this structure, a part of the ink filling opening part 13 is melted by heating and sealed (melt-sealed) As shown in FIG. 6, the ink filling opening part 13 is melt-sealed from two directions by parts of the ink filling opening part 13 that face each other. Parts 16a and 16b which are melted have non-symmetrical configurations in right and left as viewed in FIG. 6.

Thus, it is possible to seal the filling opening part 13 easily and securely by melt-sealing. According to experiments of the inventors of the present invention, in a case where parts which are melted have symmetrical configurations in right and left, a phenomenon that sealing is incomplete occurs. The inventors paid attentions to this and realized that sealing is completed and the yield rate is improved by making parts which are melted have non-symmetrical configurations.

Furthermore, as shown in FIG. 5, a piercing hole forming part 17 for discharging ink is provided inside of the ink discharging opening part 14 so as to pierce the flange part 11 and the connection part 12. At a head end part of the piercing hole forming part 17, an opening part for engaging an elastic member for sealing the piercing hole forming part 17 is formed. A step part 19 is formed at an external circumferential surface so that a cap member for holding the elastic member can be arranged.

As shown in FIG. 9, the elastic member 21 is engaged at a head end part of the ink discharge opening part 14, so that the cap member 22 is held. It is preferable that the elastic member 21 be made of silicon, fluorine, or a rubber member such as butyl, for example. When a hole pin, as ink introducing means, is stuck into the elastic member 21 from the side of a body part of the recording device so that the ink can be introduced through the side into the body part of the recording device, it is possible to both supply the ink through the side of the body part of the recording device while a sealing state is maintained, and maintain the sealing state by restoring (filling in the pin hole) with elastic member 21 when the pin is pulled out.

Hence, a configuration of the elastic member 21 is not limited as long as the sealing state can be maintained, and may be a column shape (cross-section is a circle), triangular pillar shape, rectangular pillar shape, pentagonal pillar shape, hexagonal pillar shape, heptagonal pillar shape, and octagonal pillar shape, for example.

As shown in FIG. 10 and FIG. 11, the cap member 22 is formed by a pipe-shaped member 36 having a flange part 35 for pushing a circumferential edge part of the elastic member 21. A hole forming part 37 where the pin for supplying ink is inserted from the main body side of the recording device is provided at the flange part 35. Multiple engage pieces 38 which are bent in a direction of the inside of the pipe-shaped member 36 are formed at the pipe-shaped member 36. A configuration of the hole forming part 37 is not limited to a circle but may be triangular shaped, rectangular shaped, pentagonal shaped, hexagonal shaped, heptagonal shaped, and octagonal shaped, for example.

By engaging the cap member 22 in the head end part of the ink discharge opening part 14, the engage pieces 38 are engaged with the step part 19 of the ink discharge opening part 14 so as to not be pulled out, as shown in FIG. 9.

Figure 1:
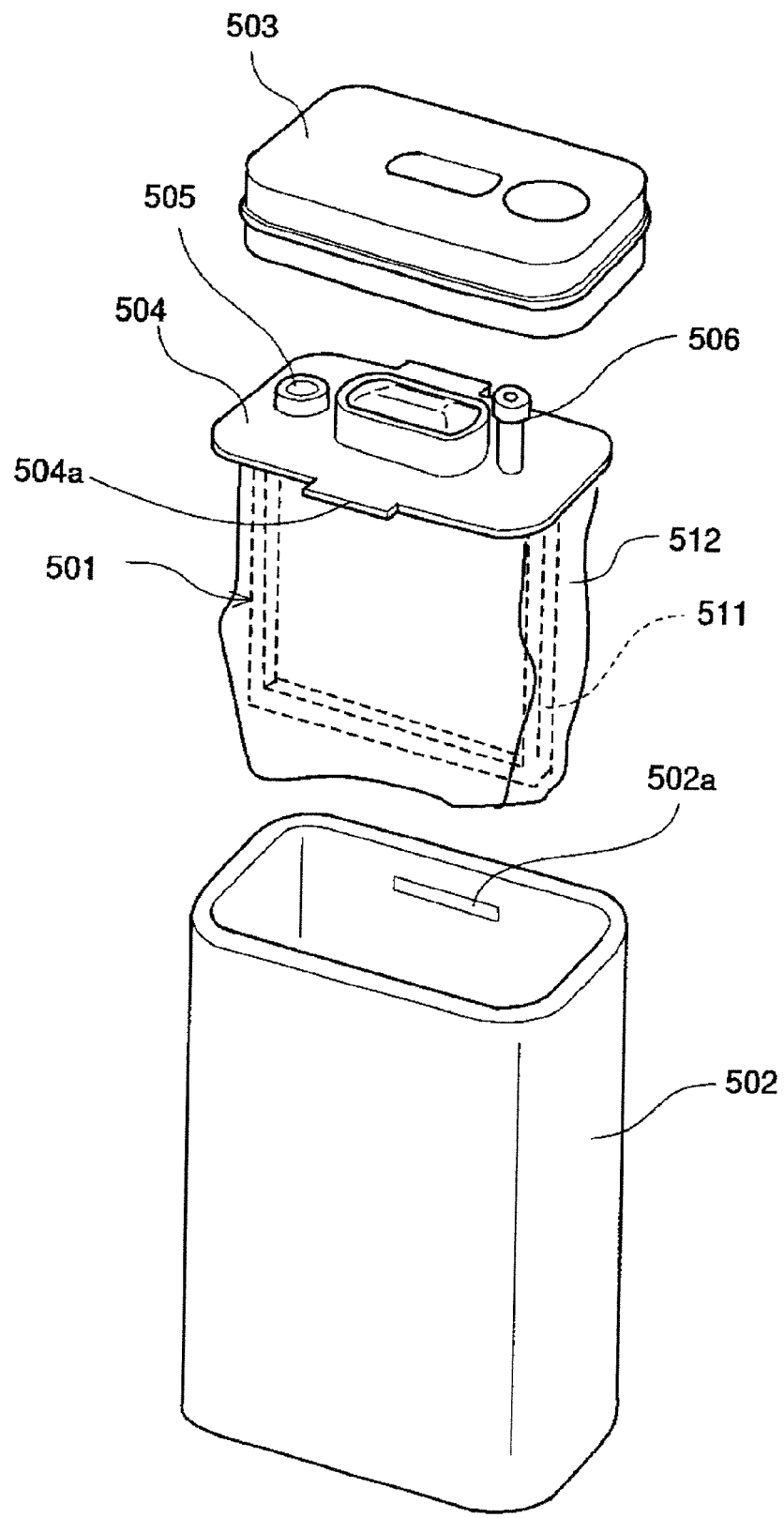
FIG. 1 is an exploded perspective view of an example of a related art ink cartridge.

As shown in FIG. 2, the ink discharge opening part 14 of the holding member 3 is provided at a substantially center part in a height direction of the ink bag 1. Because of this, in a case of an ink cartridge where the ink bag 1 is contained lengthwise, the ink flow in the ink bag main body 2 of the ink bag 1 is made smooth so that the ink can be used completely and precisely, as compared with the ink conventional case of the ink exit being unevenly distributed at one end part as shown in FIG. 1.

Furthermore, engage parts 41 and 42 for engaging with engage claws provided at a side of a housing of the ink cartridge (described later) are uniformly formed at the holding member 3. Groove forming parts 11a and 11b (see FIG. 5) are formed at corresponding parts of the engage parts 41 and 42, of a side surface of the flange part 11.

Thus, the ink bag 1 is formed by fixing the holding member 3 to one side of the ink bag main part 2 having a flexuous property and a substantially rectangular configuration. The holding member 3 has the ink filling opening part 13 for filling the ink bag main body 2 with ink and the ink discharging opening part 14 for discharging the ink from the ink bag main body 2. The ink filling opening part 13 is melt-sealed from a directions which face each other in a part of the ink filling opening part 13, and the part which is melt-sealed has a non-symmetrical configuration. The ink filling opening part 13 can be sealed easily and securely.

Figure 14:
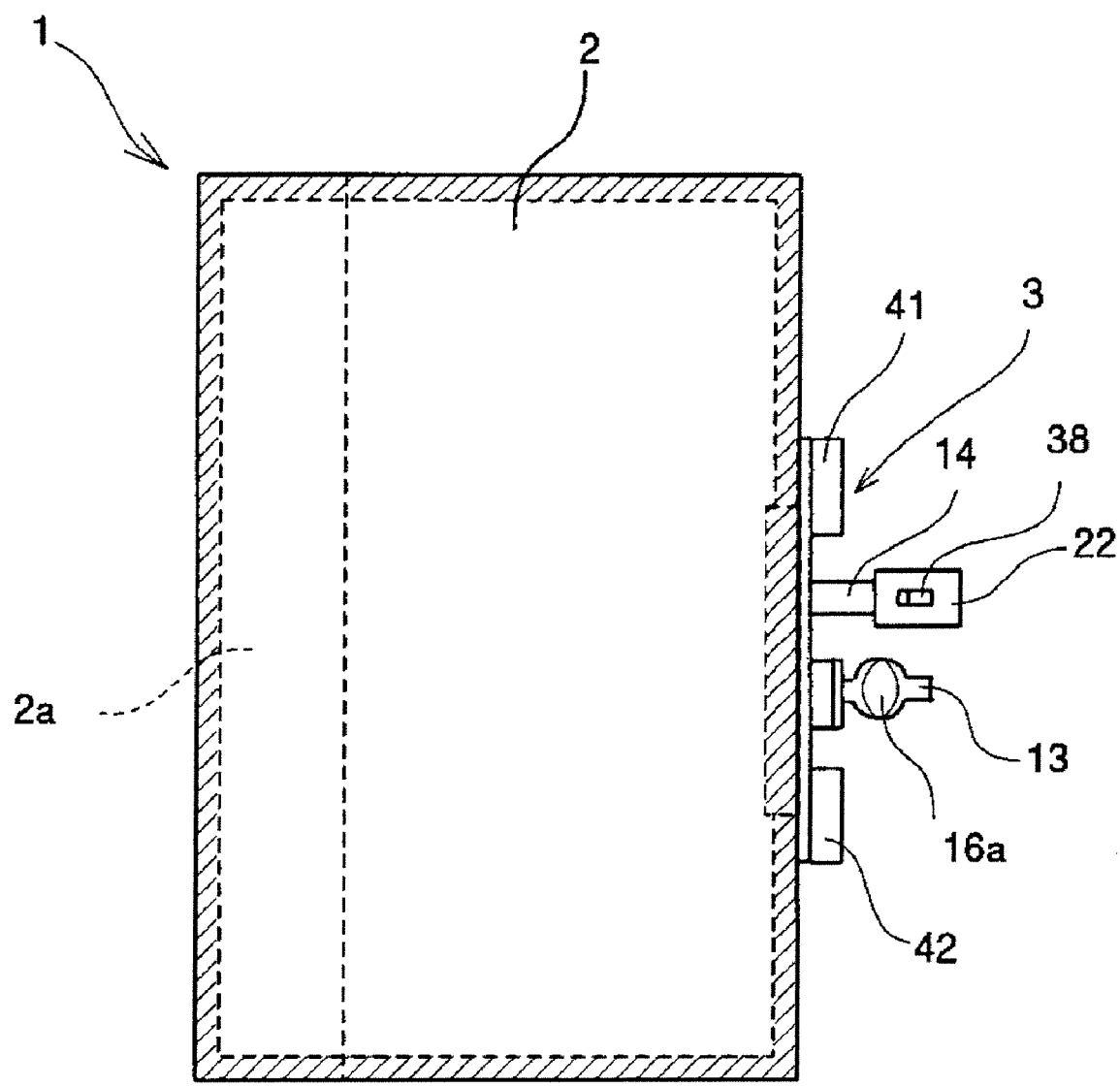
FIG. 14 is a side view showing another example of the ink bag of the present invention.
Figure 15:
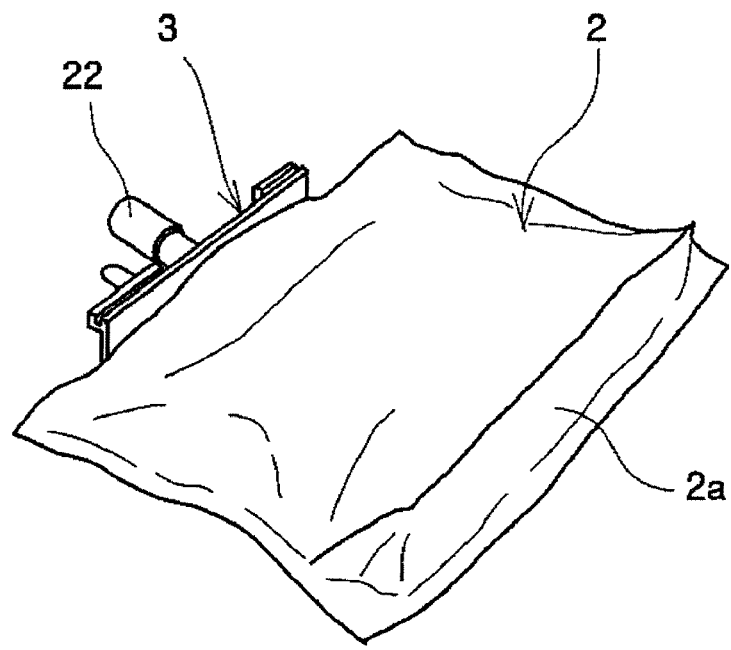
FIG. 15 is a perspective view of a state where the ink bag shown in FIG. 14 is filled with ink.
Figure 16:
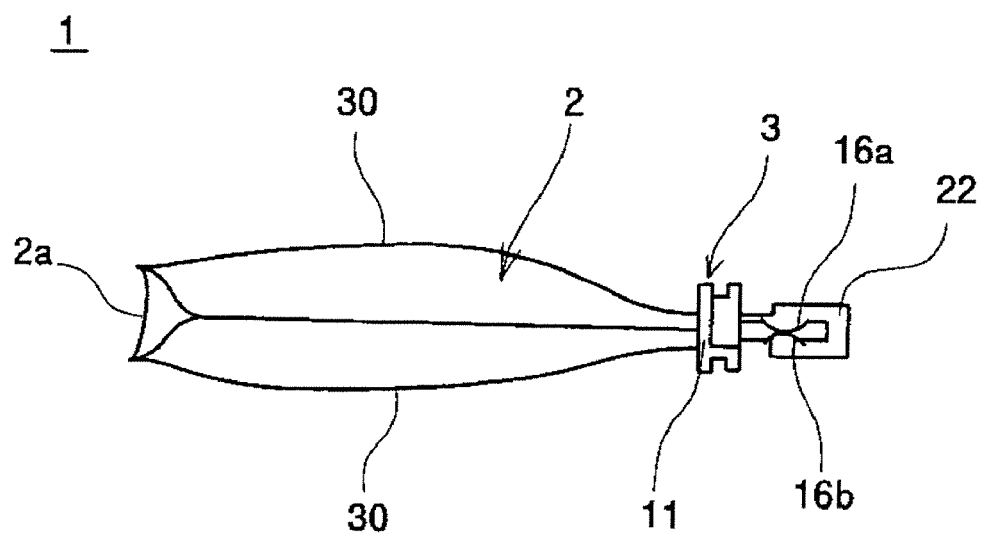
FIG. 16 is a view of a state where the ink bag shown in FIG. 14 is filled with ink, seen from a lower side of FIG. 15.

Next, another example of the ink bag of the present invention is discussed with reference to FIG. 14 through FIG. 16. FIG. 14 is a side view showing another example of the ink bag of the present invention. FIG. 15 is a perspective view of a state where the ink bag shown in FIG. 14 is filled with ink. FIG. 16 is a view of a state where the ink bag shown in FIG. 14 is filled with ink, seen from a lower side of FIG. 15.

The ink bag 1 is formed by the ink bag main body 2 having two pieces of aluminum laminated film 30 and a back surface part (a bottom part) 2a which is made of the aluminum laminate film 30 and provided at a side of a back surface of the two pieces of the main body 2 of aluminum laminated film 30. Thus, three pieces of aluminum laminate film 30 are used so that the volume of the ink bag 1 can be made large.

Figure 17:
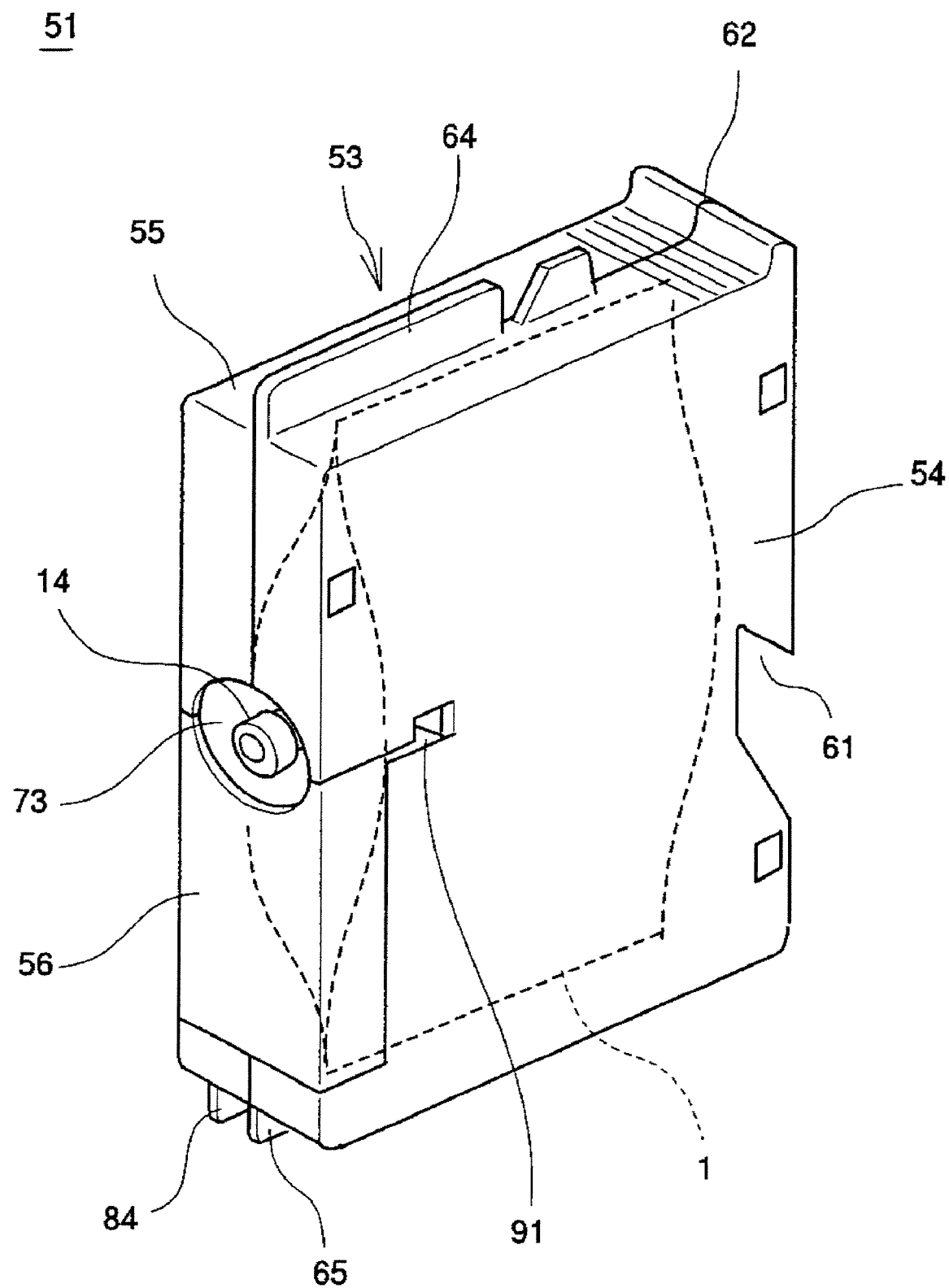
FIG. 17 is a perspective view of an ink cartridge which is an example of a liquid cartridge of the present invention.
Figure 18:
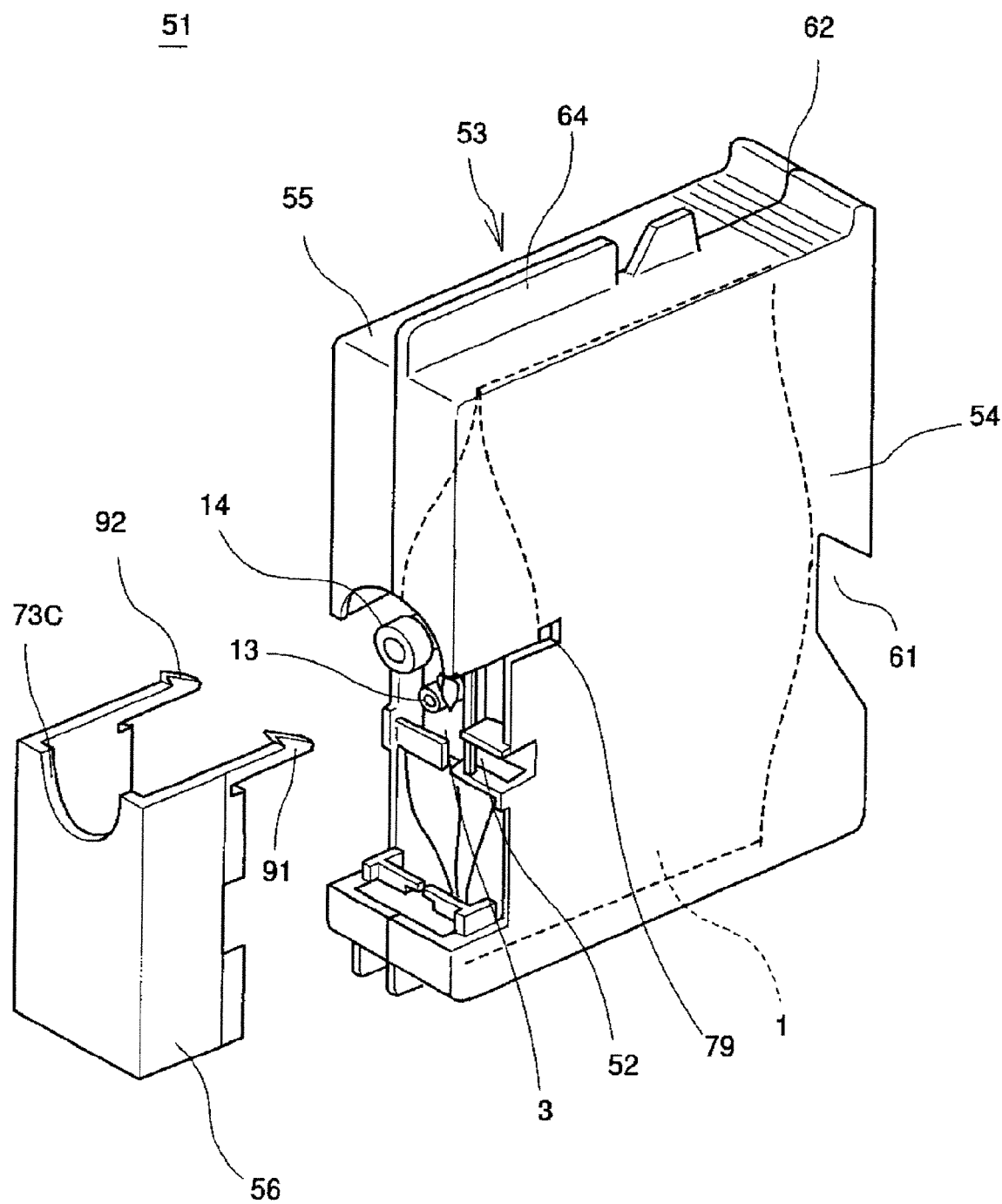
FIG. 18 is a schematic perspective view of a state where a third housing of the ink cartridge is taken off.
Figure 19:
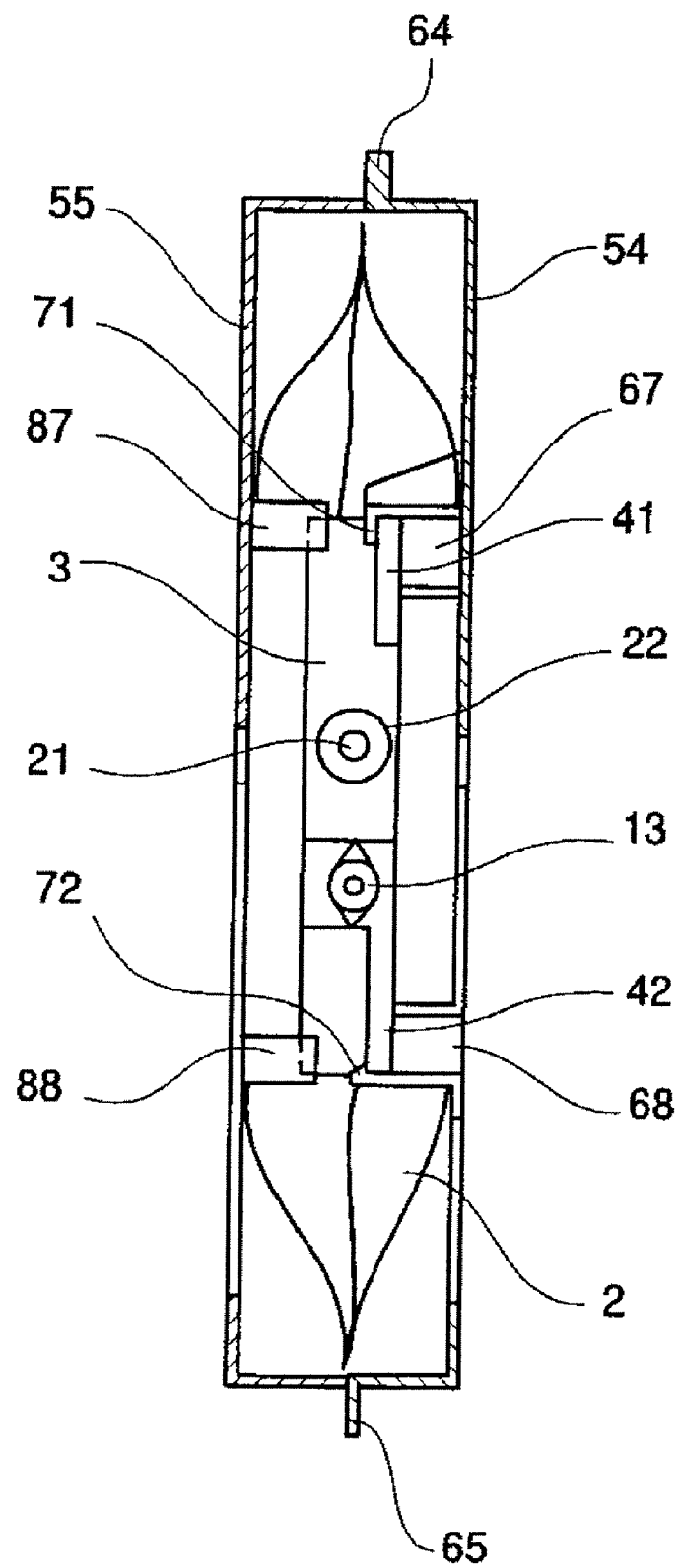
FIG. 19 is a cross-sectional view of the ink cartridge seen from a front surface side.
Figure 20:
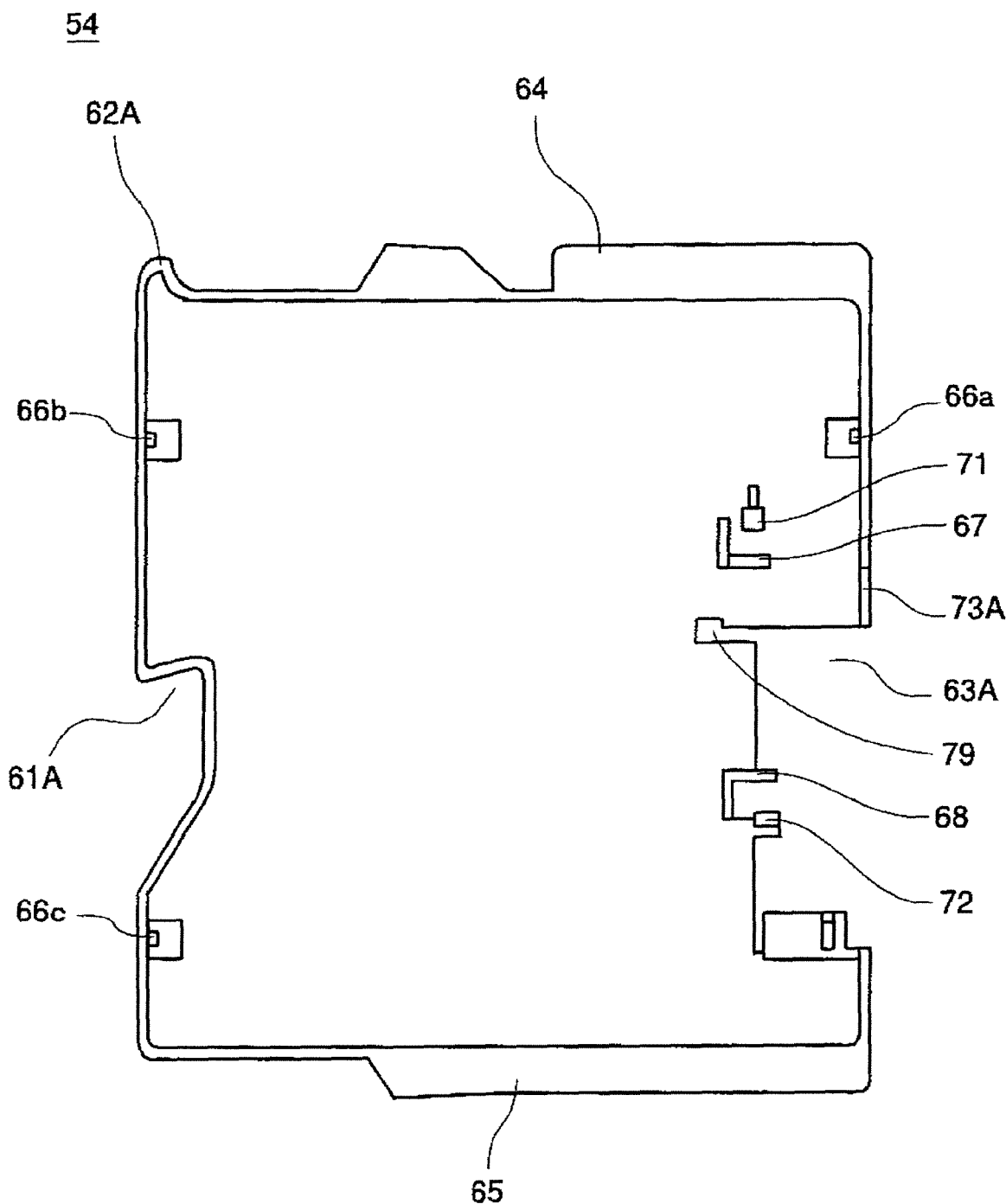
FIG. 20 is a side view of a first housing of the ink cartridge.
Figure 21:
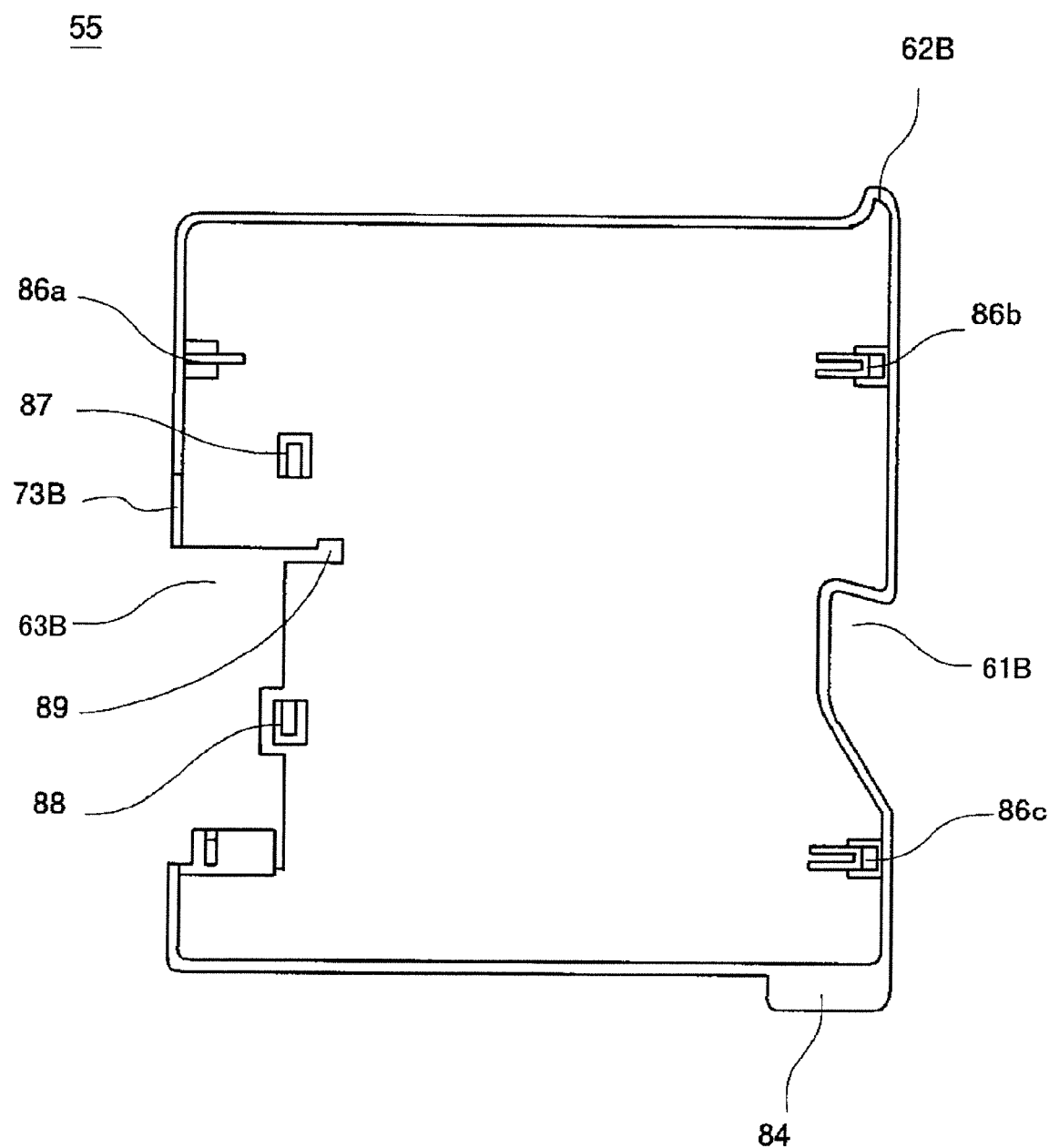
FIG. 21 is a side view of a second housing of the ink cartridge.
Figure 22:
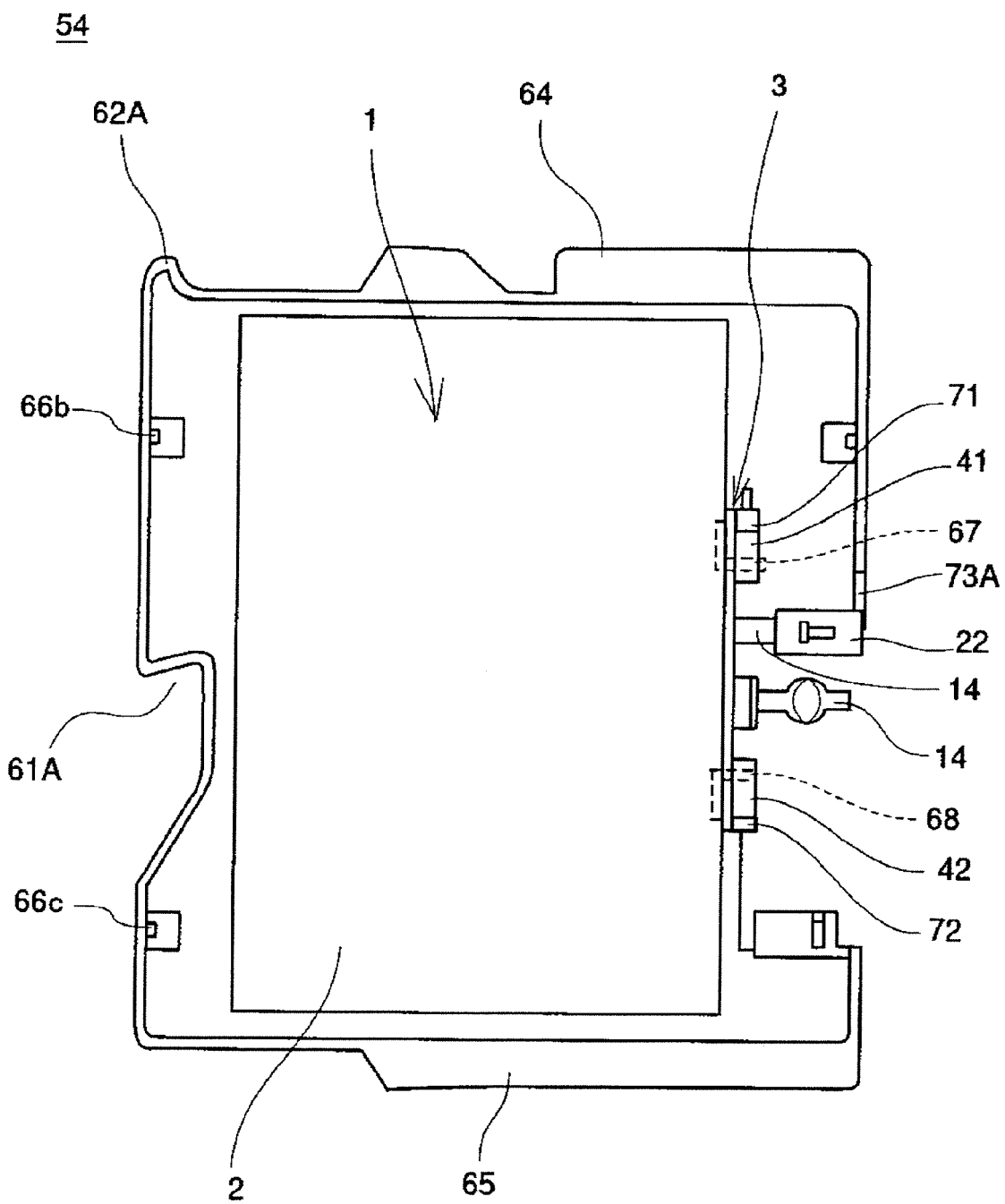
FIG. 22 is a side view showing a state where the ink bag is hung and held at the first housing of the ink cartridge.

Next, an ink cartridge of the present invention is discussed with reference to FIG. 17 through FIG. 22. FIG. 17 is a perspective view of an ink cartridge which is an example of a liquid cartridge of the present invention. FIG. 18 is a schematic perspective view of a state where a third housing of the ink cartridge is taken off. FIG. 19 is a cross-sectional view of the ink cartridge seen from a front surface side. FIG. 20 is a side view of a first housing of the ink cartridge. FIG. 21 is a side view of a second housing of the ink cartridge. FIG. 22 is a side view showing a state where the ink bag is hung and held at the first housing of the ink cartridge.

The ink cartridge 51 includes the ink bag 1 filled with ink and a housing 53 where the ink bag 1 is contained. The housing 53 includes a first housing 54, a second housing 55, and a third housing 56. The housing part functioning as a protection cover for protecting the side surfaces of the ink bag 1 is formed by the first housing 54 and the second housing 55. That is, the housing 53 is divided into the first housing 54 where the ink bag 1 is contained and the second housing 55 by a surface parallel to the direction in which the ink is supplied or discharged.

The housing 53 of the ink cartridge 51 is assembled by putting the first housing 54 and the second housing 55, which are divided and have substantially similar configurations, together and putting the third housing 56 in a lower side part of front surfaces of the first housing 54 and the second housing 55, so as to have a substantially rectangular parallelepiped configuration. Under a state where the housing 53 is assembled, as described below, a concave part 61 and a hang part 62 are formed at a back surface side, and an opening part 73 is formed at a front surface side. Because of the concave part 61, a finger can be easily inserted so that the ink cartridge 51 can be easily attached to or detached from the recording device. The ink discharge opening part 14 looks through the opening part 73 as shown in FIG. 17.

As shown in FIG. 20, the first housing 54 has a substantially rectangular configuration. At an external circumferential part of the first housing part 54, a concave part 61A, a hang part 62A, a space forming part 63A, and guide members 64 and 65 are formed in a body. The concave part 61A and the hang part 62A are formed by dividing each the concave part 61 and the hang part 62 into substantially half. In the space forming part 63A, the ink filling apparatus can be moved so as to perform an ink filling process under a state where the ink bag 1 is held by the first housing 54 and the second housing 55. The guide members 64 and 65 are used for arranging the ink cartridge to the recording device or the ink filling apparatus.

At three corners of an inside wall surface of the first housing 54, engaging parts 66a, 66b and 66c are formed so that the corresponding engage claws of the second housing 55 are engaged. In addition, in order to engage and hold the holding member 3 of the ink bag 1, positioning parts 67 and 68 for holding and positioning the holding member 3 of the ink bag 1 and engage claws 71 and 72 for engaging engage projection parts 41 and 42 of the holding member 3 stand at the inside wall surface of the first housing 54. The positioning parts 67 and 68 and the engage claws 71 and 72 forms holding means, more specifically engaging and holding means, for holding the holding member 3 of the ink bag 1.

Furthermore, an approximately one fourth circle forming part 73A is formed at a front surface of the first housing 54, namely a front surface when the ink cartridge is arranged to the recording device, in order to form a part of the opening part 73.

The first housing 54 has an engage concave part 79 where an engage claw of the third housing 56 is engaged when the third housing 56 is put in.

As shown in FIG. 21, the second housing 55 has a substantially similar configuration to the first housing 54.

At an external circumferential part of the second housing part 55, a concave part 61B, a hang part 62B, a space forming part 63B, and distinguishing means 84 are formed. The concave part 61B and the hang part 62B are formed by dividing each the concave part 61 and the hang part 62 into substantially half. In the space forming part 63B, the ink filling apparatus can be moved so as to perform an ink filling process under a state where the ink bag 2 is held by the first housing 54 and the second housing 55. The distinguishing means 84 is formed by a projection piece for expressing the color of an ink contained in the ink bag 1 of the ink cartridge 51.

At three corners of an inside wall surface of the second housing 55, engage claws 86a, 86b, and 86c are formed in a body so as to respectively hang and engage the engaging parts 66a, 66b and 66c of the first housing 54. In addition, fitting parts 87 and 88 having grooves where the holding member 3 of the ink bag 1 is fit, are provided at the inside wall surface of the second housing 55.

Furthermore, an approximately one fourth circle forming part 73B is formed at a back surface of the second housing 55, namely a front surface when the ink cartridge is arranged to the recording device, in order to form a part of the opening part 73.

The second housing 55 has an engage concave part 89 where an engage claw of the third housing 56 is engaged when the third housing 56 is put in.

Under a state where the first housing 54 and the second housing 55 are put together as shown in FIG. 18, the third housing 56 is put in the space forming parts 63A and 63B of the ink supply side front surfaces of the first housing 54 and the second housing 55. The engage claws 91 and 92 which respectively engage the engage concave parts 79 and 89 of the first housing 54 and the second housing 55 are provided at the third housing 56. Furthermore, an approximately half circle shape part 73C for forming the opening part 73 is formed at the third housing 56.

Because of the above mentioned structure, for assembling the ink cartridge 51, as shown in FIG. 22, the holding member 3 of the ink bag 1 is pushed by positioning with the positioning parts 67 and 68 of the first housing 54 so that the engage claws 71 and 72 of the first housing 54 are engaged with the engage projection parts 41 and 42 of the holding member 3 of the ink bag 1. As a result of this, the holding member 3 is engaged with and held to the first housing 54.

After that, the second housing 55 is put on the first housing 54 and a pushing force is applied from external surface sides of the first housing 54 and the second housing 55. As a result of this, the engage claws 86a-86c of the second housing 55 are engaged and fixed with the engage parts 66a-66c of the first housing 54, respectively, so that a body consisting of the first housing 54 and the second housing 55 is assembled. See FIG. 17.

As shown in FIG. 18, by putting the third housing 56 in the first housing 54 and the second housing 55, the engage claws 91 and 92 of the third housing 56 are hanged and engaged with the engage concave parts 79 and 89 of the first housing 54 and the second housing 55, respectively, so that the ink cartridge 51 shown in FIG. 17 is assembled.

Figure 24:
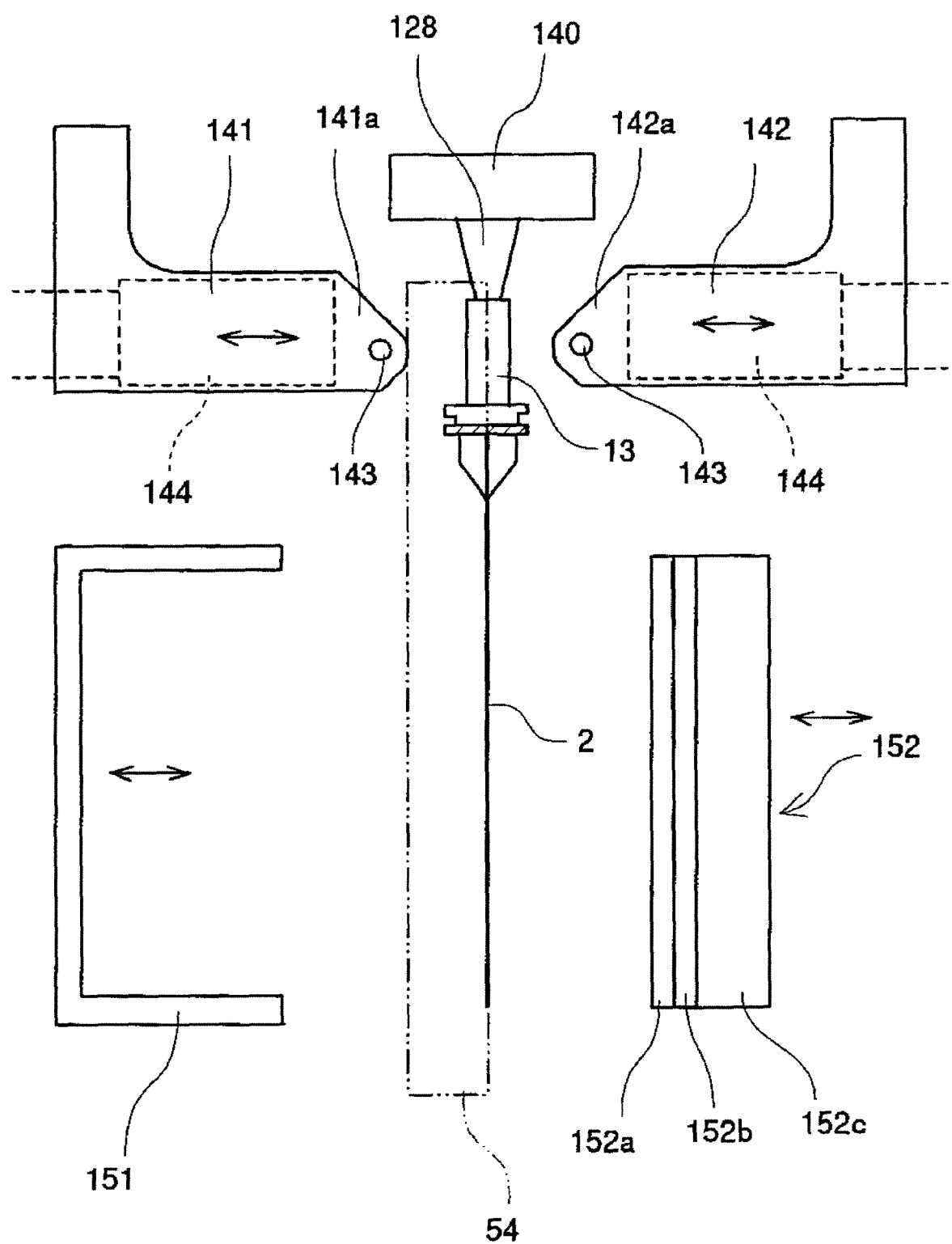
FIG. 24 is a view showing the sealing apparatus of the filling apparatus.

Next, a method and an apparatus for filling the ink bag 2 with ink, having the sealing method and sealing apparatus, are discussed with reference to FIG. 23 and FIG. 24. FIG. 23 is a structural view of a filling apparatus including a sealing apparatus of the present invention. FIG. 24 is a view showing the sealing apparatus of the filling apparatus.

By the filling apparatus, deaerated ink 100 stocked in a stock container 101 is sent to a cushion tank 103 via a coupler 102 and sent from the cushion tank 103 to a deaeration apparatus 105 via a coupler 104. The inside of the cushion tank 103 is connected to the atmosphere via an air filter 103a and connected to a valve 103b.

The deaeration apparatus 105 has a circulation path 106. A circulation pump 107, a deaeration module 108, and valves 109 and 110 are provided in the circulation path 106. A deaeration vacuum pump 111 and a deaeration vacuum open valve 112 are connected to the deaeration module 108. By operating the deaeration vacuum pump 111 while the ink 101 is circulated in the circulation path 106 with the circulation pump 107, deaeration of the ink 100 is performed with the deaerartion module 108. A valve 110 and a series circuit of valves 114 and 115 are connected to the circulation path 108 of the deaeration apparatus 105.

The circulation path 106 of the deaeration apparatus 105 is connected to an entrance side 122a of a syringe three-way valve 122 via a path 120 by a ball valve 121. A syringe metering pump 123 is connected to a common side 122c of the syringe three-way valve 122. A valve 124 is connected to the path 120.

Furthermore, an exit side 122b of the syringe three-way valve 122 is connected to a supply side 127a of a nozzle three-way valve 127 via a path 125 and a filter 126. A common side 127c of the nozzle three-way valve 127 is connected to a filling nozzle 128 for filling the ink bag with the ink 100 to the ink bag 1. A vacuum side 127b of the nozzle three-way valve 127 is connected to a trap means 133 via a path 131 and a work air vacuum three-way valve 132. The trap means 133 is connected to a work vacuum pump 134.

As shown in FIG. 24, the filling nozzle 128 is fixed and held to a nozzle holding member 140. At a lower side of the filling nozzle 128, the melt-fusing heads 141 and 142 for melt-fusing (melt-sealing) the ink filling opening part 13 from two directions which face each other are provided so as to be able to move in directions shown by the arrows in FIG. 24.

Hole forming parts 143 for arranging temperature sensors are provided at head end parts 141a and 142a of the melt-fusing heads 141 and 142, respectively, having substantially triangle configurations. In the hole forming parts 143, temperature sensors are arranged. Heaters 144 are embedded inside of the melt-fusing heads 141 and 142 so as to heat the melt-fusing heads 141 and 142.

At a lower side of the melt-fusing heads 141 and 142, clampers 151 and 152 for discharging the ink bag 1 are provided so as to be able to move in directions shown by the arrows in FIG. 24. Since a process for filling the ink bag 1 is performed in a state where the ink bag 1 is held at the first housing 54 of the ink cartridge 51, the first housing 54 is pushed by the clamper 151 and the ink bag main body 2 of the ink bag 1 is pushed by the clamper 152. A pressuring part of the clamper 152 is formed by a stacked structure of elastic members 152a and 152b and a rigid member 152c.

Furthermore, as shown in FIG. 23, a cooling blow nozzle 161 is used for cooling the ink filling opening part 13 of the ink bag 1 after the melt-fusing process is performed. In addition, an air blow valve 162 is used for opening and closing a cooling flow by the cooling blow nozzle 161.

Next, an operation of the filling device having the above mentioned structure is discussed with reference to FIG. 24 through FIG. 27.

Figure 25:
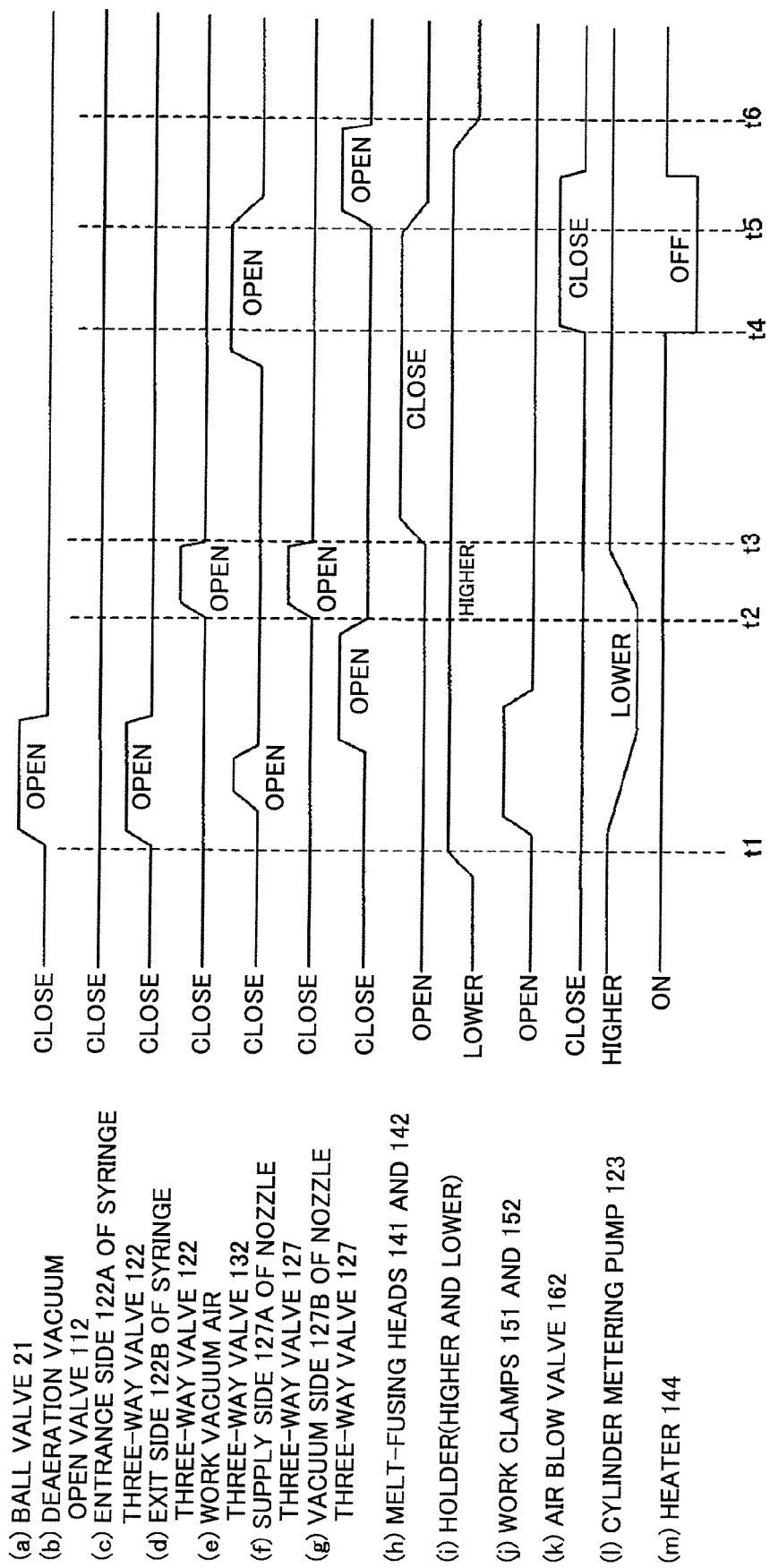
FIG. 25 is a timing diagram of an operation of the filling apparatus.

At time t1 shown in FIG. 25, the ball valve 121 is opened as shown in (a), and the entrance side 122a of the syringe three-way valve 122 is opened shown in (c). And, as shown in (1), the syringe metering pump 123 moves lower gradually so that the ink flows into the syringe metering pump 123.

Figure 26:
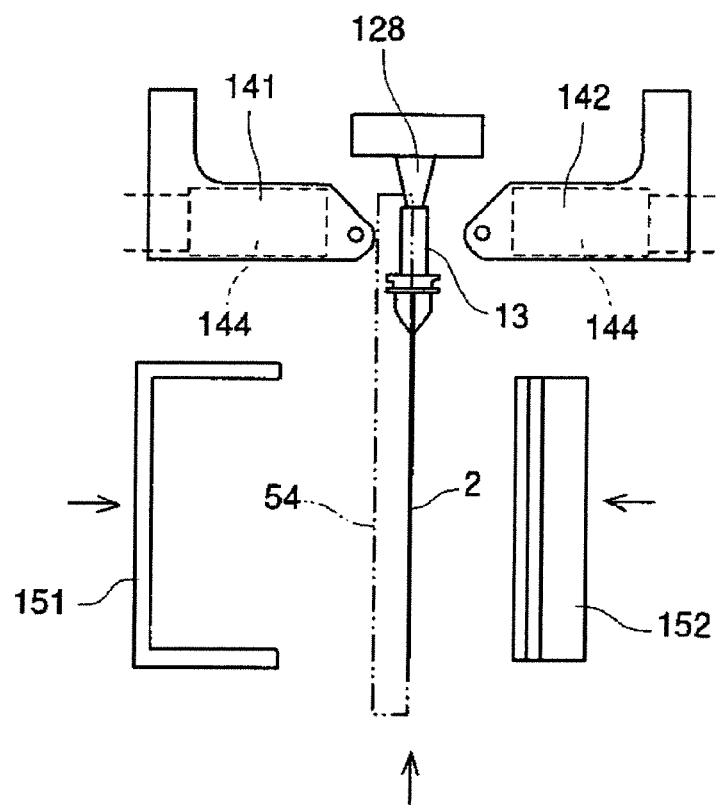
FIG. 26 is a view showing a state before a discharge operation starts, for explanation of the operation of the filling apparatus.
Figure 27:
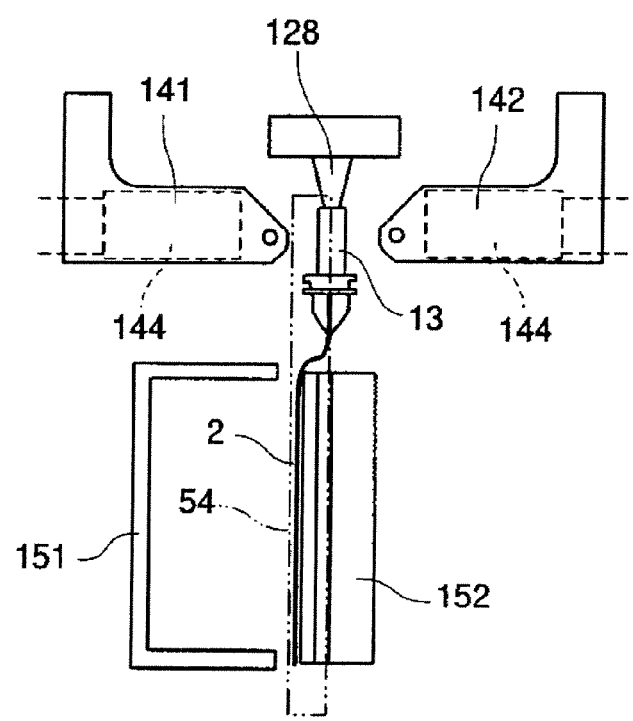
FIG. 27 is a view showing a state during implementation of the discharge operation, for explanation of the operation of the filling apparatus.
Figure 28:
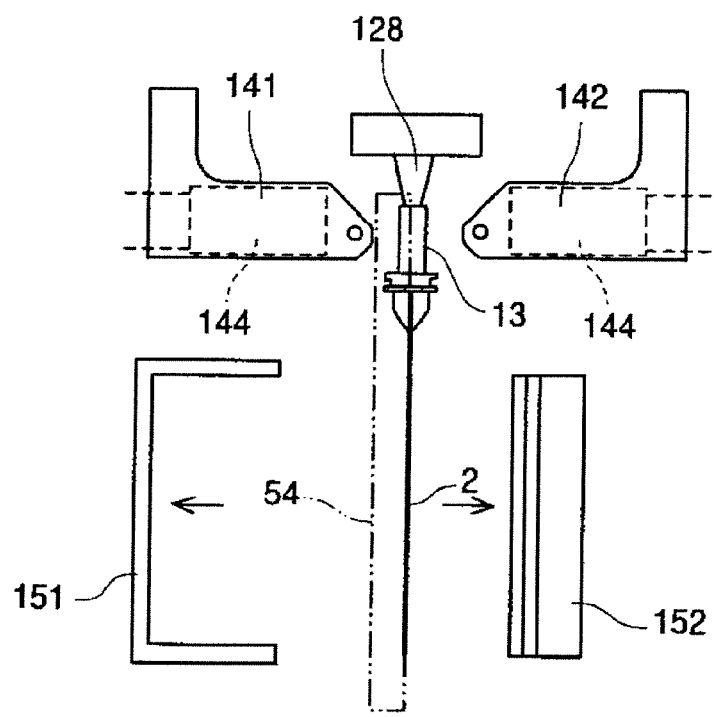
FIG. 28 is a view showing a state after the discharge operation finishes, for explanation of the operation of the filling apparatus.

On the other hand, as shown in (i), a work holder (not shown) is moved higher so that the ink bag 1 arranged at the first housing 54 as a piece of work is moved higher as shown in FIG. 26 and therefore the filling nozzle 128 is set to the ink filling opening part 13. Furthermore, as shown in (j) of FIG. 25, closing operations (moving in directions shown by the arrows in FIG. 26) of the work clamps 151 and 152 are started. As shown in FIG. 27, after the ink bag main body 2 of the ink bag 1 is discharged by pushing the ink bag 1 with the work clampers 151 and 152 via the first housing 54, the work clampers 151 and 152 return to their original positions as shown in FIG. 27. At this time, as shown in (e), the work air opening valve 132 is opened. When the work air opening valve 132 is closed, as shown in (g), the vacuum side 127b of the nozzle three-way valve 127 is opened.

Figure 29:
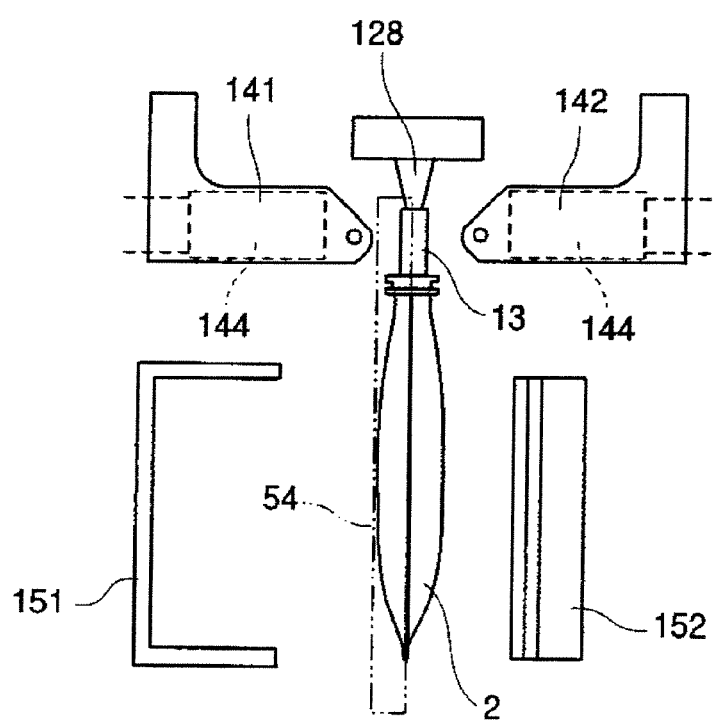
FIG. 29 is a view showing a state during implementation of filling the ink bag, for explanation of the operation of the filling apparatus.

At time t2 shown in FIG. 25, the vacuum side 127b of the nozzle three-way valve 127 is closed as shown in (g), the exit side 122b of the syringe three-way valve 122 is opened as shown in (d), and the supply side 127a of the nozzle three-way valve 127 is opened. Then, the syringe metering pump 123 is moved higher so that the ink is jetted from the filling nozzle 128 as shown in FIG. 29 and the ink fills the ink bag main body 2 from the ink filling opening part 13 of the ink bag 1.

As shown in (m) of FIG. 25, through time t2 the heater electric power of the melt-fusing heads 141 and 142 is made ON so that current flows through the heaters 144, and therefore the ink filling opening part 13 of the ink bag 1 is preliminary heated (preheated).

Figure 30:
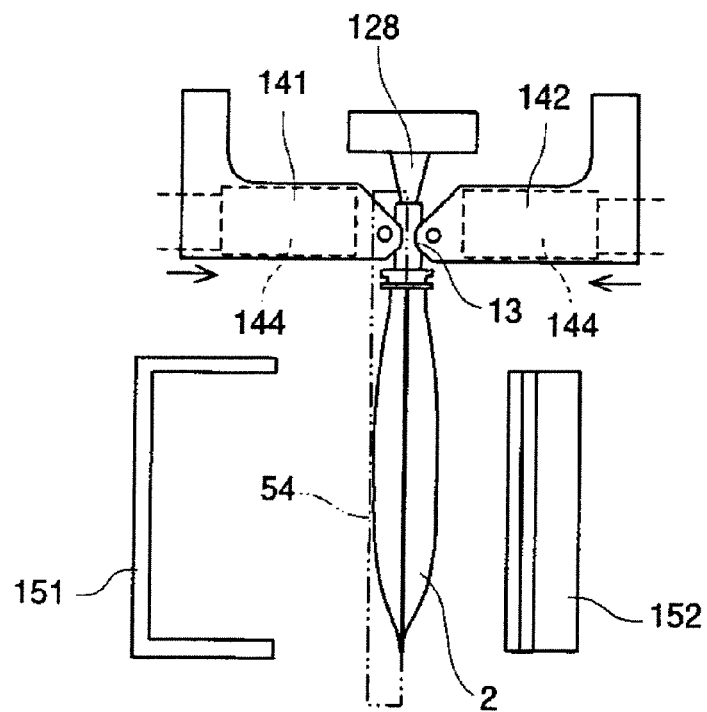
FIG. 30 is a view showing a state during melt-sealing, for explanation of the operation of the filling apparatus.

At time t3 shown in FIG. 25 and FIG. 30, the melt-fusing heads 141 and 142, which face each other, are moved in directions shown by the arrows in FIG. 30 and push ink filling opening part 13 from two directions so that the ink filling opening part 13 is melt-fused. At this time, as shown in (e) of FIG. 25, the work air vacuum open valve 132 is opened.

Figure 31:
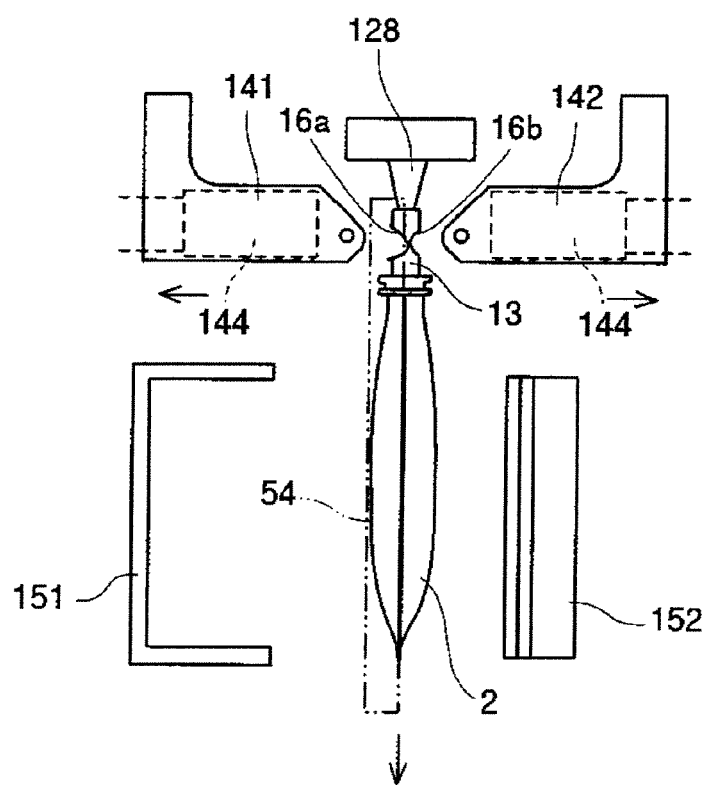
FIG. 31 is a view showing a state after melt-sealing is finished, for explanation of the operation of the filling apparatus.

After that, at time t4 shown in FIG. 25, as shown in (m) of FIG. 25, heater electric power of the melt-fusing heads 141 and 142 is made OFF, and the air blow valve 162 is opened so that the air is blown to the ink filling opening part 13 and a melt-fusing part of the ink filling opening part 13 starts being cooled. At time t5 shown in FIG. 25, as shown in FIG. 31, the melt-fusing heads 141 and 142 are moved away in the directions shown by arrows in FIG. 31, the work air vacuum open valve 132 is closed as shown in (e) of FIG. 25, and the vacuum side 127b of the nozzle three-way valve 127 is opened. Then after time t5, as shown in (m) of FIG. 25, heater electric power of the melt-fusing heads 141 and 142 is made ON, the air blow valve 162 is closed, and the vacuum side 127b of the nozzle three-way valve 127 is closed. And then, the holder is moved down.

Next, melt-fusing conditions by the melt-fusing heads 141 and 142 and a configuration of a melt-sealing part of the ink filling opening part 13 are discussed.

First, the ink filling opening part 13 was formed by materials A, B, and C whose physical properties are shown in the following table 1. Novatech HJ 360 (product name) made by Japan Polychem Corporation was used as the material A, Novatech HJ 560 (product name) made by Japan Polychem Corporation was used as the material B, and Ultra zex 4570 (product name) made by Mitsui Sumitomo Polyolefin Corporation was used as the material C. The physical properties shown in the following table 1 are values provided by the respective corporations.

TABLE 1

| | | Physical properties | | | |
|---|---|---|---|---|---|
| | Material Classification | Melt flow rate (g/10 minutes) | Vicat softening point α (° C.) | Melting point β (° C.) | β − α (° C.) |
| A | High density polyethylene | 5.5 | 122 | 131 | 9 |
| B | High density polyethylene | 7.0 | 128 | 136 | 8 |
| C | Straight-chain low density polyethylene | 7.0 | 115 | 127 | 12 |

Examples 1 through 9

As shown in the following table 2, the ink filling opening parts 13 made of the material A (example 1 through 5), the material B (example 6), or the material C (example 7 through 9) were melt-sealed under a situation where the melt-fusing heads (left head) 141 and the melt-fusing heads (right head) 142 were controlled so as to have differences of head temperatures in a range of 10° C. through 40° C.

Furthermore, the melt-fusing time and preliminary heating time were changed. In a case where the preliminary heating process was applied, the distance between the heads 141 and 142 and the ink filling opening part 13 was set as 1.5 mm and radiant heat from the heads was applied for approximately 10 seconds before melt-fusing. In a case where the preliminary heating process was not applied, the distance between the heads 141 and 142 and the ink filling opening part 13 was set as 15 mm or more, and there was no heating effect by radiant heat from the heads.

Comparison Examples 1 and 3

As shown in the following table 2, the ink filling opening parts 13 made of the material A (comparison example 1) or the material B (comparison example 3) were melt-sealed under a situation where the melt-fusing heads (left head) 141 and the melt-fusing heads (right head) 142 were controlled so as to have difference of head temperatures of 60° C.

Comparison Examples 2 and 4

As shown in the following table 2, the ink filling opening parts 13 made of the material A (comparison example 2) or the material B (comparison example 4) were melt-sealed under a situation where the melt-fusing heads (left head) 141 and the melt-fusing heads (right head) 142 were controlled so as to have a difference of head temperatures of 0° C.

A spindle having a weight of 3 kg was put on ink bags sealed according to the examples 1 through 9 and the comparison examples 1 through 4. Then, each ink bag was inspected for leakage of the ink from the ink filling opening part 13 is operated so that a 5-level (1 through 5 levels) evaluation was done, as shown in the following table 2. A practically useable level in which leakage is not generated is 3 or higher.

changed, the gluing strength of the melt-fusing part is secured by making the melt-fusing head (left head) 141 and the melt-fusing head (right head) 142 have different head temperatures. Thus, in a case where a melt-fusing process is applied under the state where the melt-fusing head (left head) 141 and the melt-fusing head (right head) 142 have different head temperatures, the melt-sealing part of the ink filling opening part 13 has a non-symmetric configuration in right and left sides as discussed with reference to FIG. 6. That is, it is possible to perform secure sealing by making the melt-sealing part of the ink filling opening part 13 have a non-symmetric configurations.

In a case where the melt-fusing head (left head) 141 and the melt-fusing head (right head) 142 have no difference of head temperatures, although the material of the ink filling opening part 13 is softened and deformed, the gluing strength of the melt-fusing part is not secured. Hence, a gluing surface is peeled off by pressure of the ink in the ink bag. Because of this, the ink enters so that the sealing is not sufficient and therefore leakage of the ink may be generated.

In cases of the examples 1 through 9 wherein the melt-fusing heads (left head) 141 and the melt-fusing heads (right head) 142 have differences of head temperatures in a range of 10° C. through 40° C. level 3 and higher levels, which are practically useable levels of the melt-fusing effect, could be obtained. However, in the cases of the comparison examples 1 and 3 where the melt-fusing heads (left head) 141 and the melt-fusing heads (right head) 142 are controlled so as to have differences of head temperatures of 60° C., level 3 and higher levels, which are practically useable levels of the melt-fusing effect, could not be obtained.

Therefore, it was found that it is preferable to set the difference of head temperatures in a range of 10° C. through 40° C. If the difference of head temperatures is larger than 40°

TABLE 2

| | Left Head (° C.) | Right Head (° C.) | Temperature Difference (° C.) | Melt-Fusing Time (Sec) | Preliminary Heating (Yes/No) | Material of Filling opening part | Evaluation |
|---|---|---|---|---|---|---|---|
| Exp. 1 | 140 | 150 | 10 | 6 | Yes | A | 5 |
| Exp. 2 | 125 | 150 | 25 | 7 | Yes | A | 5 |
| Exp. 3 | 110 | 150 | 40 | 8 | Yes | A | 3 |
| Comp. Exm. 1 | 90 | 150 | 60 | 9 | Yes | A | 2 |
| Comp. Exm. 2 | 150 | 150 | 0 | 6 | Yes | A | 2 |
| Exp. 4 | 160 | 150 | 30 | 5 | Yes | A | 4 |
| Exp. 5 | 140 | 150 | 10 | 8 | No | A | 5 |
| Exp. 6 | 140 | 150 | 10 | 6 | Yes | B | 5 |
| Exp. 7 | 140 | 150 | 10 | 5 | Yes | C | 4 |
| Exp. 8 | 125 | 150 | 25 | 6 | Yes | C | 4 |
| Exp. 9 | 110 | 150 | 40 | 7 | Yes | C | 3 |
| Comp. Exm. 3 | 90 | 150 | 60 | 8 | Yes | C | 2 |
| Comp. Exm. 4 | 150 | 150 | 0 | 5 | Yes | C | 2 |

According to the result shown in the table 2, in cases of the examples 1 through 9 wherein the melt-fusing head (left head) 141 and the melt-fusing head (right head) 142 have differences of head temperatures, level 3 or larger level which is a practically useable level as the melt-fusing effect could be obtained. However, in cases of the comparison examples 2 and 4 wherein the melt-fusing head (left head) 141 and the melt-fusing head (right head) 142 have no differences of head temperatures, level 3 and higher levels, which are practically useable levels of the melt-fusing effect, could not be obtained.

This is because when a material of the ink filling opening part 13 is softened so that the timing of the melt-fusing is C., softening at a low temperature side does not improve easily and therefore precision of gluing may be reduced.

Furthermore, according to the result of the examples 1 through 9, it is found that when the liquid filling opening part is made of a material whose a melt flow rate is equal to or higher than 5.5 g/10 minutes and equal to or lower than 7.0 g/10 minutes. The larger the value of the melt flow rate, the more the amount of flow at the time of melting. Hence, a stringiness phenomenon may occur when the melt-fusing head is taken off from the melt-fusing part. Because of this, when the melt-sealing is performed, it is preferable that the value of the melt flow rate be small. Practically, as discussed in the examples, if the liquid filling opening part 13 is made of a material whose a melt flow rate is equal to or higher than 5.5 g/10 minutes and equal to or lower than 7.0 g/10 minutes, gluing can be performed.

Furthermore, it is preferable that the liquid filling opening part be made of a material whose temperature difference between the melting point and the Vicat softening point is equal to or higher than 8° C. and equal to or lower than 12° C. The lower the temperatures of the melting point and softening point, the lower the heat energy necessary for softening and melting and therefore the more preferable in terms of energy efficiency and productivity. As the difference of temperatures of softening and melting points is bigger, a state where the material is softened but not flowing can be attained easier so that precision of gluing is improved. However if the difference of temperatures of softening and melting points is too big, the gluing effect is relatively reduced, as shown in the examples 1 through 6 and the examples 7 through 9. Therefore, practically, as discussed in the examples, if the liquid filling opening part 13 is made of a material whose temperature difference between the melting point and the Vicat softening point is equal to or higher than 8° C. and equal to or lower than 12° C., gluing can be performed.

Before the melt-fusing process is applied, by heating the melt-fusing part preliminarily so as to raise the temperature, it is possible to reduce the time for the melt-fusing process and prevent bad influences based on change of the circumference due to atmospheric temperature. Hence, a precision of melt-fusing and sealing can be improved.

Figure 32:
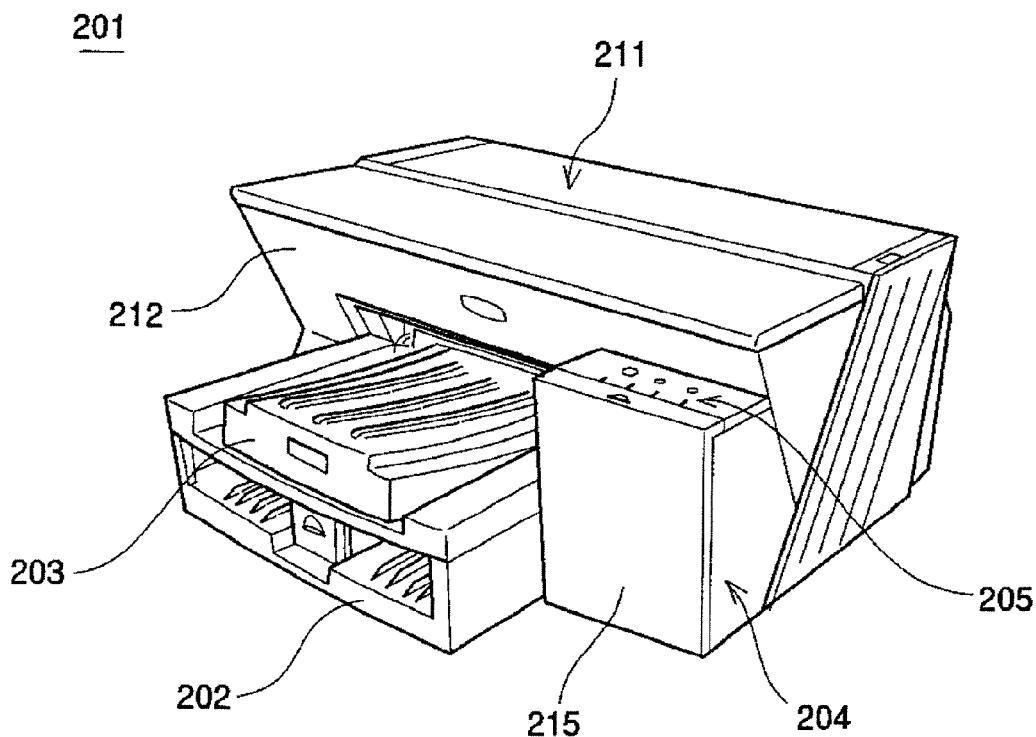
FIG. 32 is a perspective view of an ink jet recording device which is an example of an image forming device of the present invention, seen from a front surface side.
Figure 33:
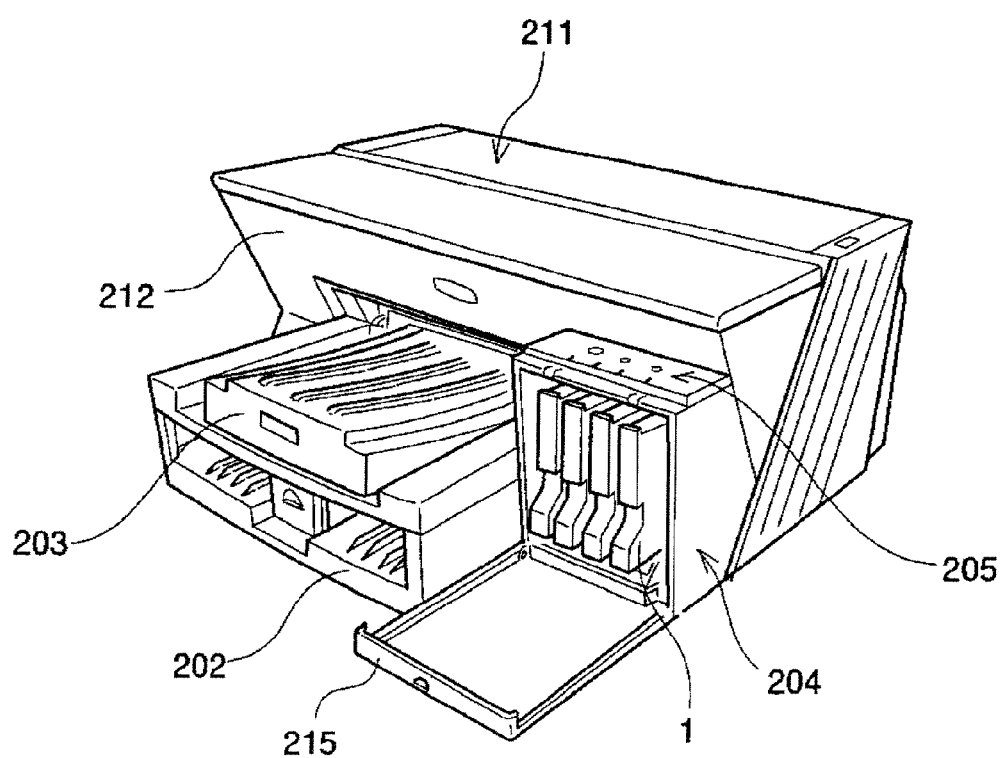
FIG. 33 is a perspective view showing a state where a cover of an ink cartridge installation part of the ink jet recording device is opened.
Figure 34:
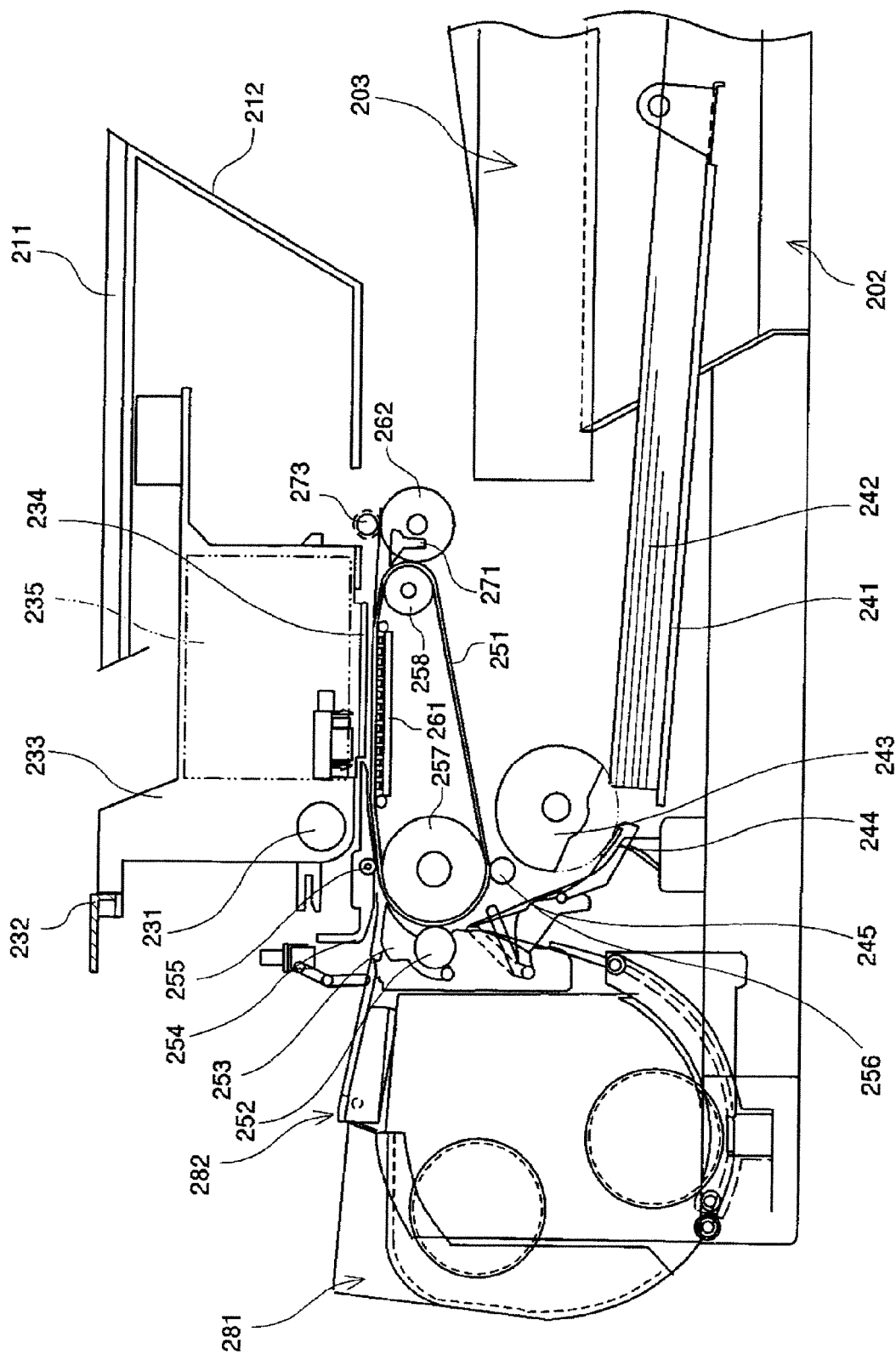
FIG. 34 is a schematic cross-sectional view showing the whole structure of a mechanism part of the ink jet recording device.

Next, an example of an image forming device wherein the ink cartridge of the present invention is used is discussed with reference to FIG. 32 through FIG. 35. FIG. 32 is a perspective view of an ink jet recording device which is an example of an image forming device of the present invention, seen from a front surface side. FIG. 33 is a perspective view showing a state where a cover of an ink cartridge install part of the ink jet recording device is opened. FIG. 34 is a schematic structural view showing the whole structure of a mechanism part of the ink jet recording device. FIG. 35 is a plan view of a main part of the mechanism shown in FIG. 34.

The ink jet recording device includes a device main body 201, a paper feeding tray 202 arranged at the device main body 201, a paper delivery tray 203 arranged at the device main body 201, and others. Papers are arranged in the paper feeding tray 202. Papers where images are recorded (formed) are placed in the paper delivery tray 203. The upper surface of an upper cover 211 of the device main body 201 is a substantially one surface. The front surface 212 of a front cover of the device main body 201 inclines downward against the upper surface. The paper delivery tray 203 and the paper feeding tray 202 projecting to the front side of the device main body 201 are provided at a lower side of the inclined front surface 212.

Furthermore, an ink cartridge arranging part 204 is provided at a part which is lower than the upper cover 211 so as to project from the front surface 212 to the front side. An operations part 205 such as an operations keys or an indicator is provided at an upper surface of the ink cartridge arranging part 204. The ink cartridge arranging part 204 has a front cover 215 which can be opened and closed so that the ink cartridge 51 of the present invention can be attached to or detached from a front surface side of the device part.

As shown in FIG. 34 and FIG. 35, in the device main body 201, the carriage 233 is held by a guide rod 231 and a stay 232 which are guide members bridging between left and right side plates (not shown), so as to be capable of being slid in a main scanning direction. The carriage 233 is moved and caused to scan by a main scanning motor (not shown) in a direction indicated by arrows in FIG. 35.

In the carriage 233, a recording head 234 is provided in a direction in which a plurality of ink jet opening parts are crosses the main scanning direction. The recording head 234 is also provided so that the ink drop jet direction is downward. The recording head 234 includes four ink jet heads which respectively jet ink drops having colors of yellow (Y), cyan (C), magenta (M), and black (Bk).

The ink jet head forming the recording head 234 may have a piezoelectric actuator such as a piezoelectric element, a thermal actuator which uses phase changes due to film boiling of liquid by using an electric thermal conversion element such as an exothermic resistor, a shape memory alloy actuator which uses metal phase changes based on temperature changes, or an electrostatic actuator which uses an electrostatic force, as energy generation means for jetting the ink.

Furthermore, sub tanks for colors are provided at the carriage 233 so that corresponding ink colors are provided to the recording head 234. The ink is supplementarily supplied from the ink discharge opening part 14 of the ink bag 1 of the ink cartridge 51 provided at the ink cartridge arranging part 205 to the sub tank 235 via the ink supply tube (not shown).

Furthermore, as a paper feeding part for feeding paper 242 (including not only paper per se but also OHP (Overhead Projector) film and means a material where an image is formed) stacked on a paper stacking part (pressure plate) 241 of the paper feeding tray 203, a half circle roller (paper feeding roller) 243 and a separation pad 244 are provided. One sheet of the paper 242 is separately fed from the paper stacking part 241 by the half circle roller 243. The separation pad 244 made of material having a large coefficient of friction faces the half circle roller (paper feeding roller) 243 and is energized to a side of the half circle roller 243.

As a conveyance part for conveying the paper 242 fed from the paper feeding part at a lower side of the recoding head 234, a conveyance belt 251, a counter roller 252, a conveyance guide 253, and a head end pressuring roller 255 are provided. The conveyance belt 251 electrostatically attaches and conveys the paper 242. The paper 242 sent from the paper feeding part via the guide 245 is put between the conveyance belt 251 and the counter roller 252 so as to be conveyed. By the conveyance guide 253, the direction of the paper 242 sent to upward in a vertical direction is turned substantially 90 degrees and the paper 242 follows on the conveyance belt 251. The head end pressuring roller 255 is pushed to a side of the conveyance belt 251 by a pressing member 254. In addition, a charging roller 256 is provided as charging means for charging a surface of the conveyance belt 251.

The conveyance belt 251 is an endless belt. The conveyance belt 251 is hung between the conveyance roller 257 and a tension roller 258 and revolves in a belt conveyance direction. The conveyance belt 251 has a surface layer and a back surface layer. The surface layer functions as a paper attraction surface formed by, for example, a pure resin material which has a width of approximately 40 μm and whose resistance is not controlled, such as ETFE (Ethylene Tetrafluoroethylene) pure material. The back surface, such as a middle resistance layer or an earth layer, is made of the same material as the surface layer. The resistance of the back surface layer is controlled by carbon content.

A guide member 261 is arranged at a back side of the conveyance belt 251 as corresponding to a printing area by the recording head 234.

Furthermore, as a paper discharging part for discharging the paper 242 recorded on by the recording head 234, a separation claw 271 for separating the paper 242 from the conveyance belt 251, a discharging roller 262, and a discharging roller 273 are provided. The paper discharging tray 203 is provided at a lower side of the discharging roller 262.

A both-surfaces paper feeding unit 281 is detachably arranged at a back surface part of the device main part 201. The both-surfaces paper feeding unit 281 takes in the paper 242 returned by reverse direction revolution of the conveyance belt 251 and turns the paper 242 over so as to feed the paper 242 again between the counter roller 252 and the conveyance belt 251. A manual paper feeding unit 282 is provided at an upper surface of the both surface paper feeding unit 281.

In the ink jet recording device having the above-discussed structure, one sheet of the paper 242 is separately fed from the feeding part. The paper 242 fed upward in a substantially vertical direction is guided by the guide 245. The paper 242 is put between the conveyance belt 251 and the counter roller 252 so as to be conveyed. Furthermore, a head end part of the paper 242 is guided by the conveyance guide 253 and pushed to the conveyance belt 251 by the head end pressure roller 255 so that the direction of the paper 242 is changed substantially 90 degrees.

At this time, the conveyance belt 257 is charged by the charging roller 256 so that the paper 242 is electrostatically attached and conveyed by the conveyance belt 251. While the carriage 233 is moved, the recording head 234 is driven correspondingly to an image signal so that ink drops are jetted onto the paper 242 which is stopped and one line is recorded. After the paper 242 is conveyed with a designated distance, the next line is recorded. The recording process is terminated based on receipt of a recording finishing signal or a signal indicated the rear end of the paper 242 has arrived at the recording area, so that the paper 242 is discharged to the paper discharging tray 203.

Based on detection of being near the end of the ink (out of ink) in the sub tank 235, a designated amount of the ink is supplied from the ink cartridge 51 to the sub tank 235.

Since this ink jet recording apparatus includes the ink cartridge 51 of the present invention, when the ink in the ink cartridge 51 is completely used, it is possible to analyze the housing 53 so that only the ink bag 1 inside of the housing 53 can be exchanged. In addition, a stable ink supply can be provided even if the ink cartridge 51 is provided lengthwise so as to have a front surface arranging structure. Because of this, even in a case where an upper part of the device main body 201 is shut because the device main body 201 is provided in a rack or something is put on an upper surface of the device main body 201, for example, it is possible to easily exchange the ink cartridge 51.

As described above, according to the liquid containing bag of the present invention, since the liquid filling opening part is melt-sealed from directions which face each other in a part of the liquid filling opening part face, and the part which is melted has a non-symmetrical configuration, it is possible to seal the filling opening part easily and securely.

Furthermore, according to the liquid cartridge of the present invention, since the liquid cartridge contains the liquid containing bag of the present invention, it is possible to prevent liquid leakage at a low cost.

Furthermore, according to the image forming device of the present invention, since the liquid cartridge of the present invention is used for the image recording device, it is possible to reduce running cost.

In addition, according to the sealing method and apparatus for the liquid containing bag of the present invention, since the liquid filling opening part is melt-sealed by pushing melt-fusing heads whose temperatures are different, from two directions which face each other to the liquid filling opening part, it is possible to seal the filling opening part easily and securely so that productivity can be improved.

The present invention is not limited to these embodiments, but variations and modifications may be made without departing from the scope of the present invention. For example, although the present invention is applied to a serial type (shuttle type) ink jet recording apparatus wherein a carriage scans in the above discussed embodiments, the present invention can be applied to a line type ink jet recording apparatus having a line type head. Furthermore, the ink jet recording device of the present invention can be applied to not only the ink jet printer but also a facsimile device, a copier, or a complex machine consisting of the printer, the facsimile device, and the copier. The liquid containing bag, the liquid cartridge, and the image forming device of the present invention can be applied not only to the ink bag, the ink cartridge, and the ink jet recording device but also to a liquid containing bag for a liquid such as resist or DNA test material, a liquid cartridge having this liquid containing bag, and an image forming device having this liquid cartridge.

This patent application is based on Japanese Priority Patent Application No. 2003-114901 filed on Apr. 18, 2003, the entire contents of which are hereby incorporated by reference.

What is claimed is:

1. A sealing method for sealing a liquid filling opening part of a liquid containing bag, the liquid filling opening part having a tube configuration through which an inside of the liquid containing bag is filled with liquid, comprising:
a step of melt-sealing the liquid filling opening part to have non-symmetrical configuration by pushing melt-fusing heads, whose temperatures are different from each other, from two directions which face each other to the liquid filling opening part.

2. The sealing method for sealing the liquid filling opening part of the liquid containing bag as claimed in claim 1, wherein a temperature difference of the melt-fusing heads is equal to or higher than 10° C. and equal to or lower than 40° C.

3. The sealing method for sealing the liquid filling opening part of the liquid containing bag as claimed in claim 1, wherein the liquid filling opening part is made of a material whose melt flow rate is equal to or higher than 5.5 g/10 minutes and equal to or lower than 7.0 g/10 minutes.

4. The sealing method for sealing the liquid filling opening part of the liquid containing bag as claimed in claim 1, wherein the liquid filling opening part is made of a material whose temperature difference between a melting point and a Vicat softening point is equal to or higher than 8° C. and equal to or lower than 12° C.

5. The sealing method for sealing the liquid filling opening part of the liquid containing bag as claimed in claim 1, further comprising: a step of heating the liquid filling opening part, preliminary to starting the step of melt-sealing, by radiant heat of the melt-fusing heads.

6. A sealing apparatus for sealing a liquid filling opening part of a liquid containing bag, the liquid filling opening part having a tube configuration through which an inside of the liquid containing bag is filled with liquid, comprising:
at least two melt-fusing heads which are moveable and face each other;
wherein the liquid filling opening part is put between the melt-fusing heads, the temperatures of the melt-fusing heads are different from each other, and the liquid filling opening part is melt-sealed by pushing the melt-fusing heads to the liquid filling opening part, wherein the melt-sealed liquid filling opening part has a non-symmetrical configuration.

7. The sealing apparatus for scaling the liquid filling opening part of the liquid containing bag as claimed in claim 6, wherein a temperature difference of the melt-fusing heads is equal to or higher than 10° C. and equal to or lower than 40° C.

8. The sealing apparatus for sealing the liquid filling opening part of the liquid containing bag as claimed in claim 6, wherein the liquid filling opening part is made of a material whose melt flow rate is equal to or higher than 5.5 g/10 minutes and equal to or lower than 7.0 g/10 minutes.

9. The sealing apparatus for sealing the liquid filling opening part of the liquid containing bag as claimed in claim 6, wherein the liquid filling opening part is made of a material whose temperature difference between a melting point and a Vicat softening point is equal to or higher than 8° C. and equal to or lower than 12° C.

10. The sealing apparatus for sealing the liquid filling opening part of the liquid containing bag as claimed in claim 6, wherein the liquid filling opening part is heated by radiant heat of the melt-fusing heads, preliminary to the start of the melting-sealing of the liquid filling opening part.

* * * * *